(12) United States Patent
Marchildon et al.

(10) Patent No.: US 12,012,163 B2
(45) Date of Patent: Jun. 18, 2024

(54) TRACK ASSEMBLY AND VEHICLE

(71) Applicants: SOUCY INTERNATIONAL INC., Drummondville (CA); BOMBARDIER RECREATIONAL PRODUCTS INC., Valcourt (CA)

(72) Inventors: Louis-Frederic Marchildon, Drummondville (CA); Patrick L'Herault, St-Majorique de Grantham (CA); Allen Bernais, Magog (CA)

(73) Assignees: SOUCY INTERNATIONAL INC., Drummondville (CA); BOMBARDIER RECREATIONAL PRODUCTS INC., Valcourt (CA)

( * ) Notice: Subject to any disclaimer, the term of this patent is extended or adjusted under 35 U.S.C. 154(b) by 691 days.

(21) Appl. No.: 17/163,847

(22) Filed: Feb. 1, 2021

(65) Prior Publication Data
US 2021/0155301 A1 May 27, 2021

Related U.S. Application Data

(63) Continuation of application No. 15/897,857, filed on Feb. 15, 2018, now Pat. No. 10,940,902.
(Continued)

(51) Int. Cl.
*B62D 55/08* (2006.01)
*A61G 5/04* (2013.01)
(Continued)

(52) U.S. Cl.
CPC ............ *B62D 55/084* (2013.01); *A61G 5/04* (2013.01); *A61G 5/041* (2013.01); *A61G 5/066* (2013.01);
(Continued)

(58) Field of Classification Search
CPC .... B62D 55/04; B62D 55/065; B62D 55/084; B62D 55/10; B62D 55/104; B62D 55/125;
(Continued)

(56) References Cited

U.S. PATENT DOCUMENTS 3,639,011 A 2/1972 Cushman et al.
3,712,688 A 1/1973 Russell
(Continued)

FOREIGN PATENT DOCUMENTS

AT 5022 B 8/1901
CA 962725 A1 2/1975
(Continued)

OTHER PUBLICATIONS

U.S. Appl. No. 17/025,158, filed Sep. 18, 2020.

*Primary Examiner* — Jacob D Knutson
*Assistant Examiner* — Marlon A Arce
(74) *Attorney, Agent, or Firm* — BCF LLP

(57) ABSTRACT

A track assembly is to be mounted on a drive axle of a vehicle. The track assembly has a frame, at least one leading idler wheel mounted to the front of the frame for rotation about a transverse leading idler wheel axis, at least one trailing idler wheel mounted to the rear of the frame for rotation about a traverse trailing idler wheel axis parallel to the leading idler wheel axis, a single drive wheel assembly, and at least two slide rails. The slide rails have corresponding forward-facing portions, central portions, and rearward-facing portions. The forward-facing portions project from the front ends of the central portions by a projection that is greater than a length of the central portions. A vehicle having the track assembly is also encompassed. A kit of track assemblies is also encompassed.

7 Claims, 11 Drawing Sheets

Related U.S. Application Data

(60) Provisional application No. 62/459,526, filed on Feb. 15, 2017.

(51) Int. Cl.
*A61G 5/06* (2006.01)
*B62D 11/20* (2006.01)
*B62D 55/04* (2006.01)
*B62D 55/065* (2006.01)
*B62D 55/084* (2006.01)
*B62D 55/10* (2006.01)
*B62D 55/104* (2006.01)
*B62D 55/125* (2006.01)
*B62D 55/14* (2006.01)
*B62D 55/24* (2006.01)
*B62D 55/26* (2006.01)
*B62D 55/30* (2006.01)
*B62K 5/01* (2013.01)
*B62M 27/02* (2006.01)

(52) U.S. Cl.
CPC .............. *B62D 11/20* (2013.01); *B62D 55/04* (2013.01); *B62D 55/065* (2013.01); *B62D 55/10* (2013.01); *B62D 55/104* (2013.01); *B62D 55/125* (2013.01); *B62D 55/14* (2013.01); *B62D 55/24* (2013.01); *B62D 55/244* (2013.01); *B62D 55/26* (2013.01); *B62D 55/30* (2013.01); *B62D 55/305* (2013.01); *B62D 55/0847* (2013.01); *B62K 5/01* (2013.01); *B62M 2027/022* (2013.01); *B62M 2027/027* (2013.01)

(58) Field of Classification Search
CPC ...... B62D 55/14; B62D 55/24; B62D 55/244; B62D 55/26; B62D 55/305; B62D 11/20
See application file for complete search history.

(56) References Cited

U.S. PATENT DOCUMENTS

| | | | |
|---|---|---|---|
| 3,724,580 A | 4/1973 | Adams |
| 3,857,616 A | 12/1974 | Tucker et al. |
| 4,069,883 A | 1/1978 | Cousineau |
| 4,459,932 A | 7/1984 | Hildebrand |
| 4,699,229 A | 10/1987 | Hirose et al. |
| 4,706,769 A | 11/1987 | Latourelle et al. |
| 4,810,043 A | 3/1989 | McIntosh |
| 4,865,141 A | 9/1989 | Gey |
| 4,881,609 A | 11/1989 | Purcell et al. |
| 4,962,941 A | 10/1990 | Rembos |
| 5,076,378 A | 12/1991 | Lagace |
| 5,330,019 A | 7/1994 | Cartwright |
| 5,547,268 A | 8/1996 | Hansen |
| 5,607,210 A | 3/1997 | Brazier |
| 5,855,248 A | 1/1999 | Rawson et al. |
| 6,006,847 A | 12/1999 | Knight |
| 6,095,275 A | 8/2000 | Shaw |
| 6,135,220 A | 10/2000 | Gleasman et al. |
| 6,155,363 A | 12/2000 | Matsumoto et al. |
| 6,164,399 A | 12/2000 | Bays |
| 6,199,646 B1 | 3/2001 | Tani et al. |
| 6,318,483 B1 | 11/2001 | Garrett et al. |
| 6,318,484 B2 | 11/2001 | Lykken et al. |
| 6,510,913 B1 | 1/2003 | Morin et al. |
| 6,609,771 B2 | 8/2003 | Morin et al. |
| 6,615,939 B1 | 9/2003 | Karales et al. |
| 6,626,258 B1 | 9/2003 | Forbes |
| 6,832,659 B1 | 12/2004 | Bares et al. |
| 6,866,108 B2 | 3/2005 | Borgwarth et al. |
| 6,874,586 B2 | 4/2005 | Boivin et al. |
| 6,982,563 B2 | 1/2006 | Phely et al. |
| 7,040,426 B1 | 5/2006 | Berg |
| 7,083,241 B2 | 8/2006 | Gunter |
| 7,255,184 B2 | 8/2007 | Loegering et al. |
| 7,311,160 B2 | 12/2007 | Lim |
| 7,389,846 B2 | 6/2008 | Grywacheski et al. |
| 7,461,712 B2 | 12/2008 | Law et al. |
| 7,497,530 B2 | 3/2009 | Bessette |
| 7,513,327 B1 | 4/2009 | Peterson |
| 7,597,161 B2 | 10/2009 | Brazier |
| 7,673,711 B1 | 3/2010 | Berg |
| 7,708,092 B2 | 5/2010 | Despres |
| 7,712,557 B2 | 5/2010 | Duceppe |
| 7,870,914 B2 | 1/2011 | Todd et al. |
| 7,874,387 B2 | 1/2011 | Despres |
| 7,921,942 B2 | 4/2011 | Schafer |
| 7,976,064 B2 | 7/2011 | Abdulaev |
| 8,007,058 B2 | 8/2011 | Bessette |
| 8,042,629 B2 | 10/2011 | Mackenzie |
| 8,056,655 B2 | 11/2011 | Mallette et al. |
| 8,056,656 B2 | 11/2011 | Todd et al. |
| 8,210,304 B2 | 7/2012 | Baldwin |
| 8,240,408 B2 | 8/2012 | Bernard et al. |
| 8,251,385 B2 | 8/2012 | Brazier |
| 8,297,383 B2 | 10/2012 | Despres |
| 8,312,945 B2 | 11/2012 | Bessette et al. |
| 8,613,332 B2 | 12/2013 | Zakuskin |
| 8,632,138 B2 | 1/2014 | Bessette |
| 8,662,214 B2 | 3/2014 | Zuchoski et al. |
| 8,695,735 B2 | 4/2014 | Afanador |
| 8,764,129 B2 | 7/2014 | Simula et al. |
| 8,776,931 B2 | 7/2014 | Boivin |
| 8,783,392 B2 | 7/2014 | Underwood |
| 8,794,358 B2 | 8/2014 | Hansen |
| 8,801,115 B2 | 8/2014 | Hansen |
| 8,844,665 B2 | 9/2014 | Wenger et al. |
| 8,851,581 B2 | 10/2014 | Marchildon et al. |
| 8,955,925 B2 | 2/2015 | Bessette et al. |
| 8,967,736 B2 | 3/2015 | Zakuskin |
| 9,004,510 B2 | 4/2015 | Leonard et al. |
| 9,033,430 B2 | 5/2015 | Zuchoski et al. |
| 9,211,921 B2 | 12/2015 | Zuchoski et al. |
| 9,260,145 B2 | 2/2016 | Korus et al. |
| 9,296,436 B2 | 3/2016 | Coe et al. |
| 9,352,776 B2 | 5/2016 | Hansen |
| 9,440,692 B2 | 9/2016 | Vik et al. |
| 9,457,831 B2 | 10/2016 | Rivard et al. |
| 9,505,432 B2 | 11/2016 | Pare et al. |
| 9,505,451 B2 | 11/2016 | Zuchoski et al. |
| 9,586,635 B2 * | 3/2017 | Sewell ................... B62D 55/12 |
| 2002/0017403 A1 | 2/2002 | Phely |
| 2003/0025392 A1 | 2/2003 | Morin et al. |
| 2004/0026995 A1 | 2/2004 | Lemieux et al. |
| 2004/0159475 A1 | 8/2004 | Moor |
| 2005/0145422 A1 | 7/2005 | Loegering et al. |
| 2006/0060395 A1 | 3/2006 | Boivin et al. |
| 2006/0158034 A1 | 7/2006 | Standish et al. |
| 2007/0107950 A1 | 5/2007 | Ki |
| 2007/0261898 A1 | 11/2007 | Bessette |
| 2008/0196947 A1 | 8/2008 | Brazier |
| 2008/0211299 A1 | 9/2008 | Wilt |
| 2009/0050389 A1 | 2/2009 | Watling |
| 2009/0065270 A1 | 3/2009 | Bordini |
| 2010/0012399 A1 | 1/2010 | Hansen |
| 2010/0060075 A1 | 3/2010 | Hansen |
| 2010/0206648 A1 | 8/2010 | Kelppe et al. |
| 2010/0230185 A1 | 9/2010 | Mallette et al. |
| 2011/0048817 A1 | 3/2011 | Bessette et al. |
| 2011/0120793 A1 | 5/2011 | Lucarelli |
| 2011/0180335 A1 | 7/2011 | Ivankov et al. |
| 2011/0186363 A1 | 8/2011 | Ivankov et al. |
| 2011/0291473 A1 | 12/2011 | Reshad et al. |
| 2011/0315459 A1 | 12/2011 | Zuchoski |
| 2012/0090903 A1 | 4/2012 | Bessette et al. |
| 2012/0104840 A1 | 5/2012 | Zuchoski et al. |
| 2012/0286565 A1 | 11/2012 | Marchildon et al. |
| 2013/0181431 A1 | 7/2013 | Mcmahon et al. |
| 2014/0034400 A1 | 2/2014 | Underwood et al. |
| 2014/0035355 A1 | 2/2014 | He et al. |
| 2014/0175864 A1 | 6/2014 | Marchildon et al. |
| 2015/0035354 A1 | 2/2015 | Dandurand et al. |

(56) References Cited

U.S. PATENT DOCUMENTS

| | | |
|---|---|---|
| 2015/0048672 A1 | 2/2015 | Okada |
| 2015/0129329 A1 | 5/2015 | Cox |
| 2015/0136497 A1 | 5/2015 | Morin |
| 2015/0166133 A1 | 6/2015 | Eavenson, Sr. et al. |
| 2015/0183464 A1 | 7/2015 | Mannering |
| 2015/0321711 A1 | 11/2015 | Vik et al. |
| 2015/0329154 A1 | 11/2015 | Roy |
| 2015/0329155 A1 | 11/2015 | Marchildon et al. |
| 2015/0375826 A1 | 12/2015 | Sampson et al. |
| 2016/0016639 A1 | 1/2016 | Pard et al. |
| 2016/0052569 A1 | 2/2016 | Buchanan et al. |
| 2016/0075384 A1 | 3/2016 | Mattson |
| 2016/0114840 A1 | 4/2016 | L'Herault et al. |
| 2016/0114841 A1 | 4/2016 | Gagne et al. |
| 2016/0194038 A1 | 7/2016 | Jean et al. |
| 2016/0200378 A1 | 7/2016 | Dandurand et al. |
| 2016/0257358 A1 | 9/2016 | Johnson et al. |
| 2016/0304141 A1 | 10/2016 | Marchildon et al. |
| 2017/0036714 A1* | 2/2017 | Lunkenbein ............ B62D 55/14 |
| 2017/0043821 A1 | 2/2017 | Dandurand et al. |
| 2017/0057573 A1 | 3/2017 | Gentry |
| 2017/0120970 A1 | 5/2017 | Zuchoski et al. |
| 2017/0158267 A1 | 6/2017 | Boivin |
| 2017/0233018 A1 | 8/2017 | Buchanan et al. |
| 2017/0291652 A1 | 10/2017 | Marchildon et al. |
| 2017/0305483 A1 | 10/2017 | Rehberg |
| 2018/0229783 A1 | 8/2018 | Marchildon et al. |
| 2018/0229784 A1 | 8/2018 | Marchildon et al. |
| 2018/0237083 A1 | 8/2018 | Marchildon et al. |
| 2018/0244326 A1 | 8/2018 | Zuchoski |
| 2018/0265146 A1 | 9/2018 | Laplante et al. |
| 2018/0354568 A1 | 12/2018 | Gustafson |
| 2019/0092405 A1 | 3/2019 | Dandurand |
| 2019/0248432 A1 | 8/2019 | Gagne et al. |
| 2019/0248433 A1 | 8/2019 | Aubin-Marchand et al. |

FOREIGN PATENT DOCUMENTS

| | | |
|---|---|---|
| CA | 2226812 A1 | 7/1998 |
| CA | 2229247 A1 | 8/1999 |
| CA | 2296781 A1 | 7/2001 |
| CA | 2650933 A1 | 7/2009 |
| CA | 2677421 A1 | 8/2009 |
| CA | 2735095 A1 | 9/2012 |
| CA | 2612356 C | 10/2014 |
| CA | 2800044 C | 2/2016 |
| DE | 102007055196 A | 8/2009 |
| EP | 270237 A1 | 6/1988 |
| EP | 1110851 A1 | 6/2001 |
| EP | 1110852 A1 | 6/2001 |
| EP | 1237778 A1 | 9/2002 |
| EP | 1442969 B1 | 11/2006 |
| EP | 2391531 A1 | 12/2011 |
| ES | 2083342 A6 | 4/1996 |
| FR | 2663285 A1 | 12/1991 |
| RU | 2005118056 A | 12/2006 |
| RU | 2308396 C1 | 10/2007 |
| RU | 2329156 C2 | 7/2008 |
| RU | 2341402 C2 | 12/2008 |
| RU | 2347708 C2 | 2/2009 |
| RU | 2399539 C2 | 9/2010 |
| RU | 144342 U1 | 8/2014 |
| RU | 2577999 C2 | 3/2016 |
| WO | 2008049218 A1 | 5/2008 |
| WO | 2014056085 A1 | 4/2014 |
| WO | 2016109891 A1 | 7/2016 |
| WO | 2016131140 A1 | 8/2016 |

* cited by examiner

TRACK ASSEMBLY AND VEHICLE

CROSS-REFERENCE

The present application is a Continuation Application of U.S. patent application Ser. No. 15/897,857 filed Feb. 15, 2018, entitled "Track assembly and Vehicle". Through the application Ser. No. 15/897,857, the present application claims priority to U.S. Provisional Patent Application Ser. No. 62/459,526, filed Feb. 15, 2017, entitled "Traction assembly and Vehicle". Both applications are incorporated herein by reference in their entirety.

TECHNICAL FIELD

The present technology relates to track assemblies and vehicles having track assemblies.

BACKGROUND

All-Terrain Vehicles ("ATV's") are four-wheeled off-road vehicles. ATV's are designed for "all" terrains (i.e., many off-road terrains). ATV wheels are usable with "all" terrains but may not be optimized for one or more particular types of terrain. Given that wheels may not provide optimal traction on certain types of terrain, e.g. mud, snow, sand, etc., track systems were developed to be used on ATV's in place of the wheels. ATV's, however, including their frames, suspensions, and fairings, were designed for having wheels as ground-contacting elements, and not for having tracks.

Track systems have been developed to replace wheels of ATVs, in order to improve traction and/or flotation of the ATVs in some driving conditions. Wheels are circular in shape (and thus when rotated maintain the same shape—and are designed to be rotated in use) and are generally smaller than track systems. Tracks systems typically have frames that are triangular in shape and are generally larger than wheels.

One type of track systems has been developed for ATVs which has a central guide rail. The guide rail of a track system of this type has idler wheels and mid-rollers rotationally mounted thereto. The mid-rollers support the track against terrain. The guide rail keeps the endless track of the track system from coming out of alignment with the idler wheels and the mid-rollers and thereby keeps the endless track from coming off the track system.

When such a track system is mounted onto an ATV, for example as a front track system of the ATV, the track system supports a part of the weight of the ATV on terrain when the ATV is in use. More particularly, the track system transfers that part of the weight of the ATV onto the terrain via some or all of the mid-rollers and via the parts of the endless track of the track system that those mid-rollers roll on when the track system is driven in a straight line on the terrain. In some such track systems, when the ATV turns, and thus correspondingly drives the track system in a curve, the guide rail of the track system contacts an inner surface of the endless track and helps support the endless track on the terrain. This type of existing track system is further referred to herein as a "guide rail type track system".

Existing track systems are suitable for their intended purposes. However, improvements to existing systems are desirable.

SUMMARY

In conventional wisdom, to improve vehicle performance, such as traction and acceleration, the horsepower of the vehicle's motor is increased. Such an approach is often practiced with snowmobiles.

However, as it has been found by the creators of the present technology, sometimes increasing a vehicle's motor horsepower may be relatively expensive and may not provide the desired performance improvements in some driving conditions. The creators of the present technology have found that this may more often be the case with vehicles such as ATVs and Side by Side vehicles, than with snowmobiles. In one aspect, the creators of the present technology have found that the propulsion mechanisms by which ATV and Side-by-Side track assemblies propel such vehicles differ from the propulsion mechanisms of snowmobiles, at least when such vehicles are used on snow.

In one aspect, the track of a snowmobile is designed to eject snow from under the track and thereby propel the snowmobile. ATV and Side-by-side vehicle tracks, on the other hand, often pull on snow trapped between traction lugs of the tracks in order to propel such vehicles. The creators of the present technology have found that this difference in propulsion mechanisms may be leveraged in some cases to provide vehicle performance improvements for some types of driving conditions and for some types of terrain without necessarily needing to increase a vehicle's horsepower.

It is an object of the present technology to ameliorate at least some of the inconveniences present in the prior art.

For purposes of this application, terms related to spatial orientation such as forward, rearward, upward, downward, left, and right, are as they would normally be understood by a driver of the vehicle sitting on the driver seat of the vehicle in a normal riding position. Terms related to spatial orientation when describing or referring to components or sub-assemblies of the vehicle and of various components for the vehicle, separately from the vehicle should be understood as they would be understood when these components or sub-assemblies are mounted to the vehicle, unless specified otherwise in this application.

For purposes of this application, the term "average angle", when used to describe a characteristic of a curved portion of a slide rail, is an integral-average angle defined by the shape of the curved portion of a slide rail.

The creators of the present technology have found that a disadvantage with the guide rail type track systems is that while such track systems are driven in a straight line, a large part of, and in some cases all of the weight of the vehicle to which such track systems are mounted, which weight is supported by the track systems on terrain, is transferred into the terrain via the mid-rollers of the track-systems. The creators of the present technology have found that pressure exerted by each of those mid-rollers onto the parts of the endless track of the track systems that those mid-rollers roll on when the track systems are driven in a straight line is relatively high. The creators of the present technology have further found that in some such cases these track systems generate traction lug wag, which is movement of traction lugs relative to the frame of a track system that results when mid-rollers of the track system roll over the traction lugs. In some cases, when such a track system is driven on generally flat horizontal soft snow, this being one example of flat horizontal terrain, the wag of the traction lugs moves the traction lugs in the snow instead of allowing them to sit on the snow, and thereby reduces traction. The creators of the present technology have further found that in some cases when such a track system is driven on generally flat horizontal compacted snow, or over a road for example, a sub-optimal amount of vibration results.

In one aspect, the creators of the present technology have engineered certain track systems in which relatively smaller forces are applied to traction lugs in some driving conditions, including some flat horizontal soft snow driving conditions and/or flat horizontal compacted snow driving conditions. In some such implementations, a relatively smaller number of mid-rollers, and certain particular arrangements of mid-rollers, as will be described in more detail herein, are used. In some driving conditions, this provides traction improvements. In some driving conditions, this provides steering improvements. In another aspect, the present technology provides for particular geometries of a track system frame. In some driving conditions, this provides traction improvements. In some driving conditions, this provides steering improvements.

According to one aspect of the present technology, there is provided a track assembly to be mounted on one of a front left drive axle and a front right drive axle of a vehicle. The track assembly includes: a) a frame having a front, a rear, a bottom, a left side, and a right side, a longitudinally-extending left slide rail positioned at the bottom of the frame on the left side of the frame, and a longitudinally-extending right slide rail positioned at the bottom of the frame on the right side of the frame; b) a drive wheel rotationally mounted to the frame for rotation about a drive wheel axis, the drive wheel having a peripheral surface, the drive wheel being structured to be operatively connected to one of the front left drive axle and the front right drive axle of the vehicle to be driven by the one of the front left drive axle and the front right drive axle and to support a part of the vehicle's weight on terrain; c) a front idler wheel assembly mounted at the front of the frame for rotation about a front idler wheel assembly axis parallel to the drive wheel axis, the front idler wheel assembly having a peripheral surface; d) a rear idler wheel assembly mounted at the rear of the frame for rotation about a rear idler wheel assembly axis parallel to the drive wheel axis, the rear idler wheel assembly having a peripheral surface; and e) a track having an inner surface facing the drive wheel, and an outer surface opposite the inner surface, the outer surface having a plurality of traction lugs distributed along the outer surface.

In some implementations, the left and right slide rails, the drive wheel, the front idler wheel assembly and the rear idler wheel assembly are positioned relative to the frame to support the track around the drive wheel peripheral surface, the front idler wheel assembly peripheral surface, and the rear idler wheel assembly peripheral surface.

In some implementations, a bottom surface of each of the left and right slide rails supports the endless track against flat horizontal terrain when the track assembly is mounted on the one of the front left drive axle and the front right drive axle of the vehicle and the vehicle is stationary on the flat horizontal terrain.

In some implementations, the track is in driving engagement with the drive wheel, and at least one of the front idler wheel assembly and the rear idler wheel assembly is selectively movable between a plurality of longitudinally-distributed tension positions to tension the track.

In some implementations, the left slide rail has: a) a first central portion, the first central portion having a central portion length; b) a first forward-facing portion extending forward from a front end of the first central portion by a forward horizontal projection, and being angled upward from the first central portion; and c) a first rearward-facing portion extending rearward from a rear end of the first central portion by a rearward horizontal projection, and being angled upward from the first central portion.

In some implementations, the right slide rail has: a) a second central portion, the second central portion having the central portion length; b) a second forward-facing portion extending forward from a front end of the second central portion by the forward horizontal projection, and being angled upward from the second central portion; and c) a second rearward-facing portion extending rearward from a rear end of the second central portion by the rearward horizontal projection, and being angled upward from the second central portion.

In some implementations, the forward horizontal projection is greater than the central portion length.

In some implementations, the rearward horizontal projection is greater than the central portion length.

In some implementations, the central portion length is between 60 millimeters and 220 millimeters.

In some implementations, the forward horizontal projection is between 250 millimeters and 580 millimeters.

In some implementations, the rearward horizontal projection is between 180 millimeters and 240 millimeters.

In some implementations, the first forward-facing portion is angled upward from the first central portion by an average first angle, the second forward-facing portion is angled upward from the second central portion by the average first angle, and the average first angle is between 15 degrees and 39 degrees.

In some implementations, the first rearward-facing portion is angled upward from the first central portion by an average second angle, the second rearward-facing portion is angled upward from the second central portion by the average second angle, and the average second angle is between 3 degrees and 45 degrees.

In some implementations, the track assembly further includes a plurality of mid-rollers rotationally mounted to the frame between the left and right slide rails, each of the mid-rollers extending downward below a bottom surface of each of the first and second central portions to roll on an interior surface of the endless track when the track assembly is in use.

In some implementations, the plurality of mid-rollers project downward below the bottom surface of each of the first and second central portions by a distance that is in a range of two millimeters to six millimeters.

In some implementations, each mid-roller of the plurality of mid-rollers is longitudinally offset from the rest of the mid-rollers of the plurality of mid-rollers.

In some implementations, the plurality of mid-rollers is positioned relative to the left and right slide rails such that points of contact between the plurality of mid-rollers and the interior surface of the endless track define a triangle, the triangle having a centroid.

In some implementations, the centroid of the triangle is positioned longitudinally in between a first transverse reference line and a second transverse reference line, the first transverse reference line passing through the front ends of the first and second central portions and the second transverse reference line passing through the rear ends of the first and second central portions.

In some implementations, the centroid is positioned in front of the drive wheel axis.

In some implementations, the triangle has an area that is in a range of 90% to 150% of an area of contact between a 25×8–12 all-terrain vehicle tire and flat horizontal terrain when the tire is mounted onto an all-terrain vehicle and is stationary on the flat horizontal terrain and the all-terrain vehicle is at gross vehicle weight.

According to one aspect of the present technology, there is provided a vehicle. The vehicle includes the track assembly and the track assembly is a front track assembly. The drive wheel of the track assembly is operatively connected to one of a front left drive axle and a front right drive axle of the vehicle to be driven by the one of a front left drive axle and a front right drive axle and such that when the vehicle is stationary on flat horizontal terrain, the front track assembly supports a part of the vehicle's weight on the flat horizontal terrain.

In some implementations, the track assembly is pivotable about a steering axis of the vehicle, the steering axis passes through the endless track at a reference point, the frame of the track assembly is connected to the vehicle by a rotation limiting device, and the rotation limiting device is adjusted such that the reference point is in front of the centroid of the triangle.

In some implementations, the track assembly is a front left track assembly, the steering axis is a front left steering axis, the reference point is a first reference point, the rotation limiting device is a first rotation limiting device, the drive wheel of the front left track assembly is operatively connected to the front left drive axle of the vehicle, the vehicle includes a front right track assembly, the front right track assembly is a mirror image of the front left track assembly, the drive wheel of the front right track assembly is operatively connected to the front right drive axle of the vehicle, the front right track assembly is pivotable about a front right steering axis of the vehicle, the front right steering axis passes through the endless track at a second reference point, the frame of the front right track assembly is connected to the vehicle by a second rotation limiting device, and the second rotation limiting device is adjusted such that the second reference point is in front of the centroid of the triangle of the front right track assembly.

In some implementations, each of the first and second rotation limiting devices is a dynamic traction device.

In some implementations, the vehicle is one of: an all-terrain vehicle and a side-by-side vehicle.

The foregoing examples are non-limiting.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
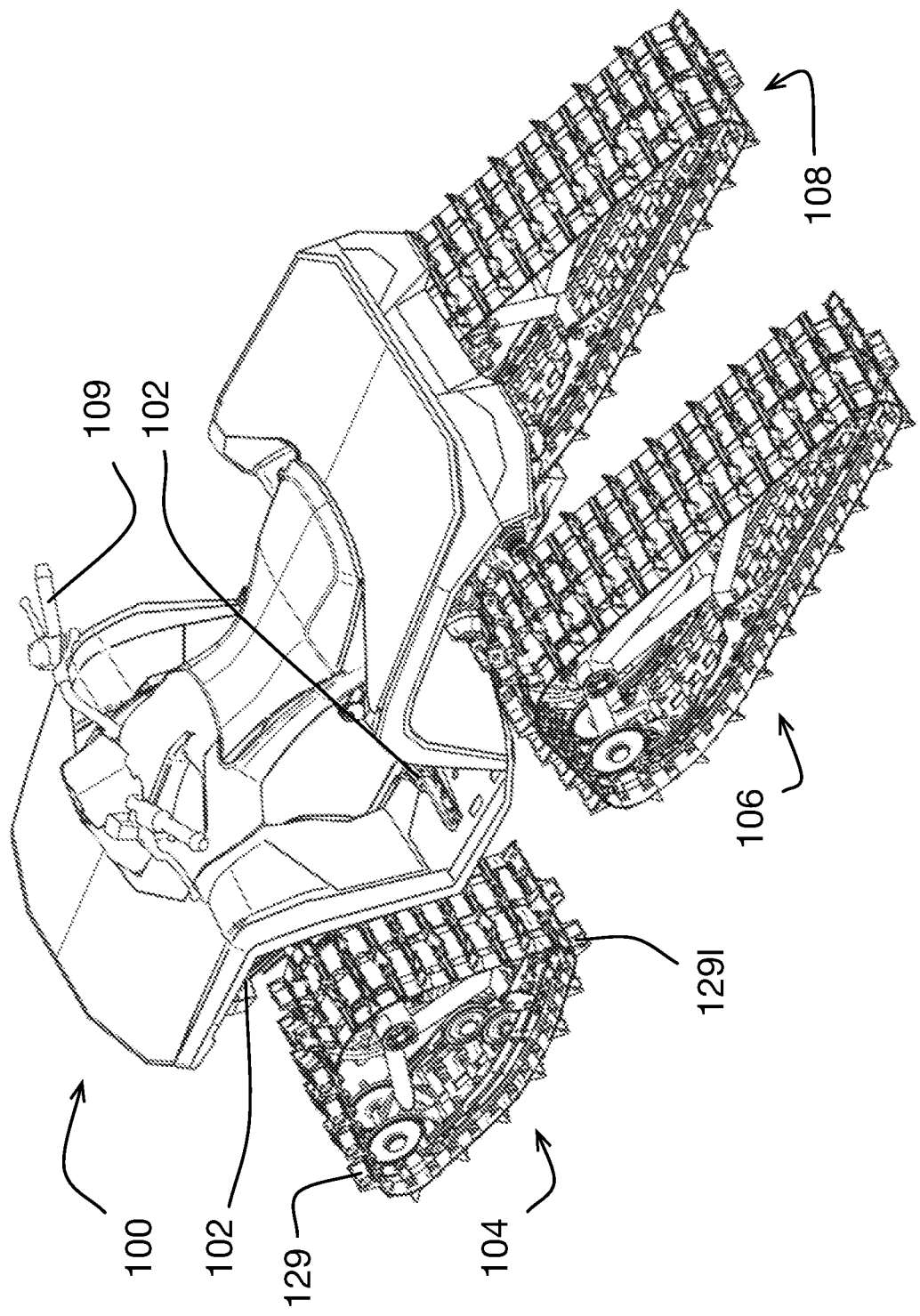
FIG. 1 is a perspective view of a rear left top side of an all-terrain vehicle equipped with four track assemblies.
Figure 2:
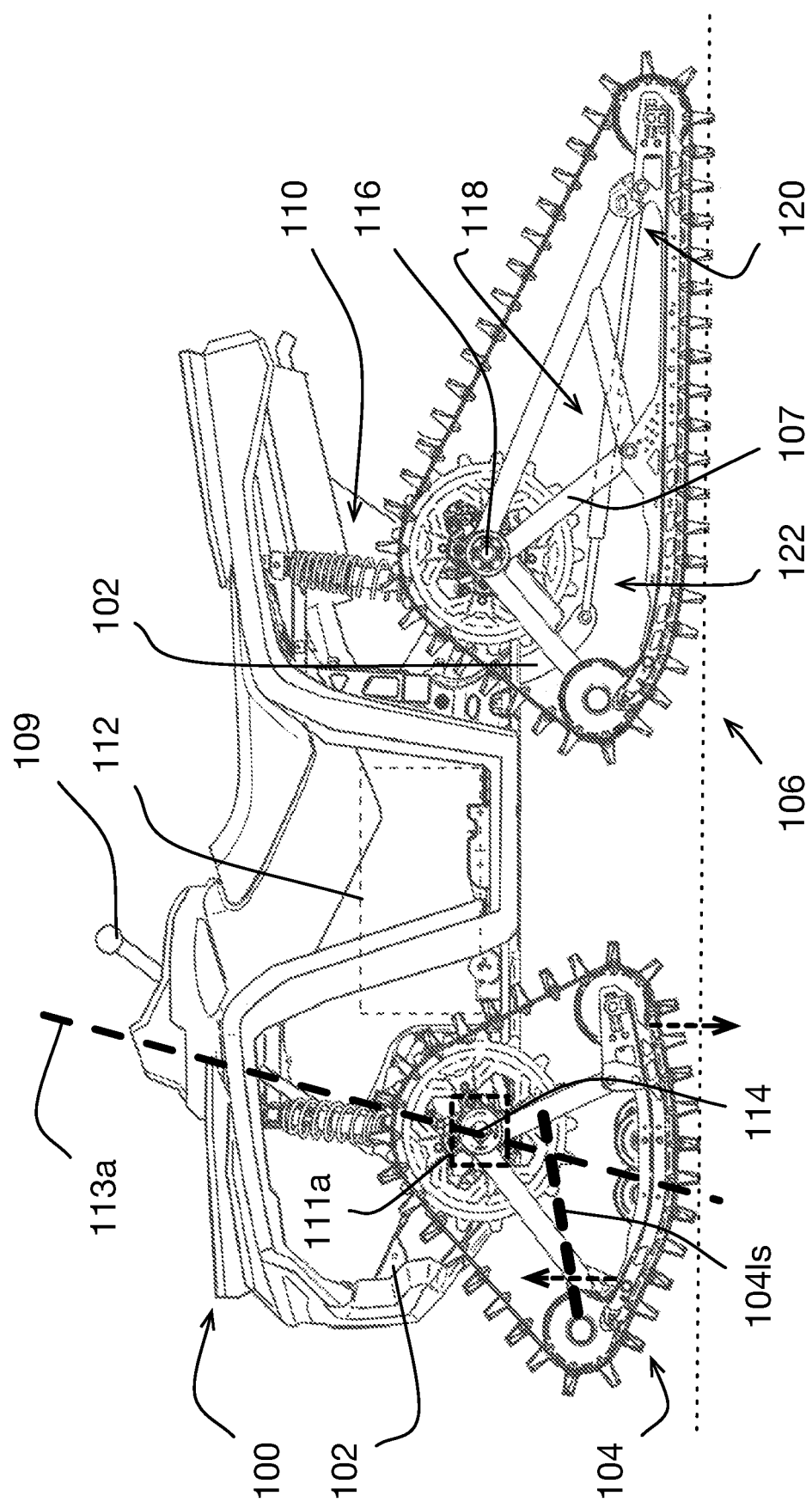
FIG. 2 is an elevation view of a left side of the all-terrain vehicle of FIG. 1.

The present technology is described with regard to its use with an All-Terrain Vehicle ("ATV") 100, shown in FIGS. 1 and 2. The ATV 100 is an example of a vehicle with which the present technology could be used. It is contemplated that the present technology could be used with other vehicles, including a side-by-side vehicle and a motorized wheelchair.

As shown, the ATV 100 has a chassis 102. The chassis 102 supports a front left track assembly 104, a front right track assembly 105 (FIG. 3), a rear left track assembly 106 and a rear right track assembly 108 via a suspension system 110 (FIG. 2). The front right track assembly 105 is a mirror image of the front left track assembly 104. The rear right track assembly 108 is a mirror image of the rear left track assembly 106. In the present implementation, the suspension system 110 of the ATV 100 is a conventionally known swing arm suspension in the rear of the ATV 100 and a conventionally known double A-arm suspension in the front of the ATV 100. The suspension system 110 is not described herein in detail. It is contemplated that a different suspension could be used.

Figure 3:
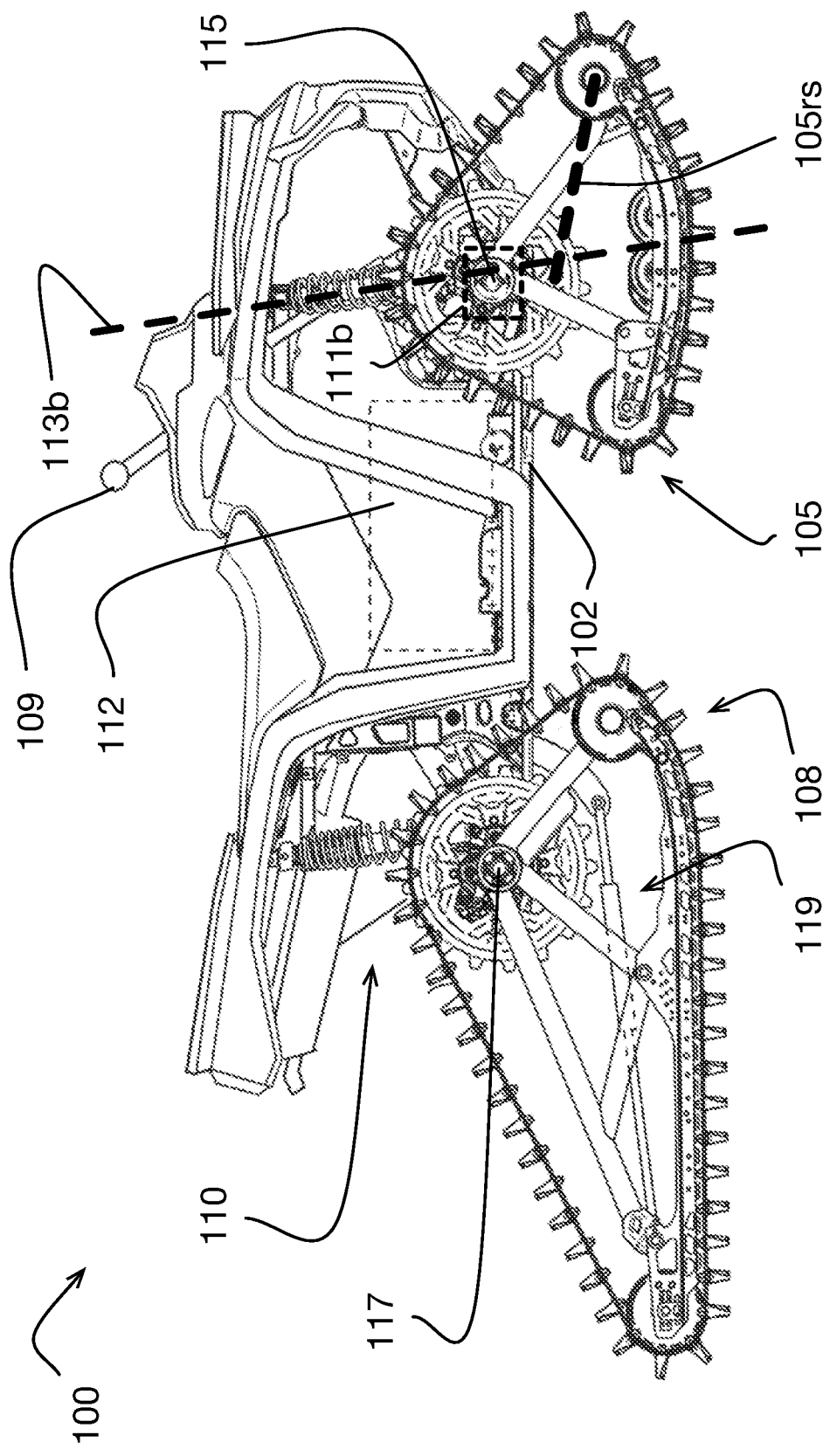
FIG. 3 is an elevation view of a right side of the all-terrain vehicle of FIG. 1.

As shown in FIGS. 2 and 3, the ATV 100 has an engine 112 supported by the vehicle chassis 102 for providing motive power to propel the ATV 100. To this end, the ATV 100 has a front left drive axle 114, a front right drive axle 115, a rear left drive axle 116, and a rear right drive axle 117. All four of the drive axles 114, 115, 116, 117 are operatively connected to the engine 112 via a transmission (not shown), to be driven by the engine 112 to drive the track assemblies 104, 105, 106, 108 of the ATV 100 to propel the ATV 100. In the present implementation, the front right drive axle 115 is a mirror image of the front left drive axle 114 and the rear right drive axle 117 is a mirror image of the rear left drive axle 116.

The ATV 100 further includes handlebars 109 and a steering system (not shown) that operatively connects the handlebars 109 to the two front track assemblies 104, 105 to pivot the front track assemblies 104, 105 by pivoting the handlebars 109 and to thereby steer the ATV 100. The steering system includes a pair of conventionally known steering knuckles 111a, 111b that is used for steering the front track assemblies 104, 105. More particularly, a front left steering knuckle 111a of the pair of steering knuckles 111a, 111b is shown schematically in FIG. 2, and a front right steering knuckle 111b of the pair of steering knuckles 111a, 111b is shown schematically in FIG. 3.

In the present implementation, each of the steering knuckles 111a, 111b defines front left and front right steering axes 113a, 113b, respectively, which are schematically shown in FIGS. 2 and 3. The front left track assembly 104 pivots about the front left steering axis 113a. The front right track assembly 105 pivots about the front right steering axis 113b. It is contemplated that the steering axes 113a, 113b could be positioned differently, depending on each particular implementation of the ATV 100 for example.

In the present implementation, each of the front track assemblies 104, 105 is connected to the chassis 102 of the ATV 100 via a conventionally known rotation limiting device 104ls, 105rs, respectively. In the present implementation, the rotation limiting devices 104ls, 105rs are conventionally known and are therefore shown only schematically in FIGS. 2 and 3, to maintain clarity. It is contemplated that locations of the points of connection of each of the rotation limiting devices 104ls, 105rs may be chosen differently to suit each particular implementation of the track assemblies 104, 105 and vehicle with which the particular implementation of the track assemblies 104, 105 is to be used. In the present implementation, the rotation limiting devices 104ls, 105rs limit pivoting and control angular positioning of respective ones of the front track assemblies 104 about the respective ones of the front drive axles 114, 115.

As shown in FIG. 2, in the present implementation, each of the rear left track assemblies 106, 108 is connected to the chassis 102 of the ATV 100 via a dynamic traction device 118, 119. In the present implementation, the dynamic traction device 118 is connected at one end 120 to a rear portion of a frame 107 of the rear left track assembly 106 and at the other end 122 to the chassis 102. In one aspect, the dynamic traction device 118 controls pivoting of the rear left track assembly 106 about the drive axle 116 when the ATV 100 is in use. The dynamic traction device 118 and the rear left track assembly 106 are described in more detail in commonly owned U.S. patent application Ser. No. 15/485,699, filed Apr. 12, 2017, entitled "Track System for Attachment to a Vehicle", which application is hereby incorporated herein in its entirety.

As shown in FIG. 3, the rear right track assembly 108 is connected to the chassis 102 via a dynamic traction device 119 that is a mirror image of the dynamic traction device 118, in the same way as the rear left track assembly 106 is connected to the chassis 102 via the dynamic traction device 118. It is contemplated that the rear track assemblies 106, 108 could be connected to the chassis 102 via suitable conventionally known rotation limiting devices to limit pivoting of the rear track assemblies 106, 108, instead of the dynamic traction devices 118, 119 for example.

Figure 4:
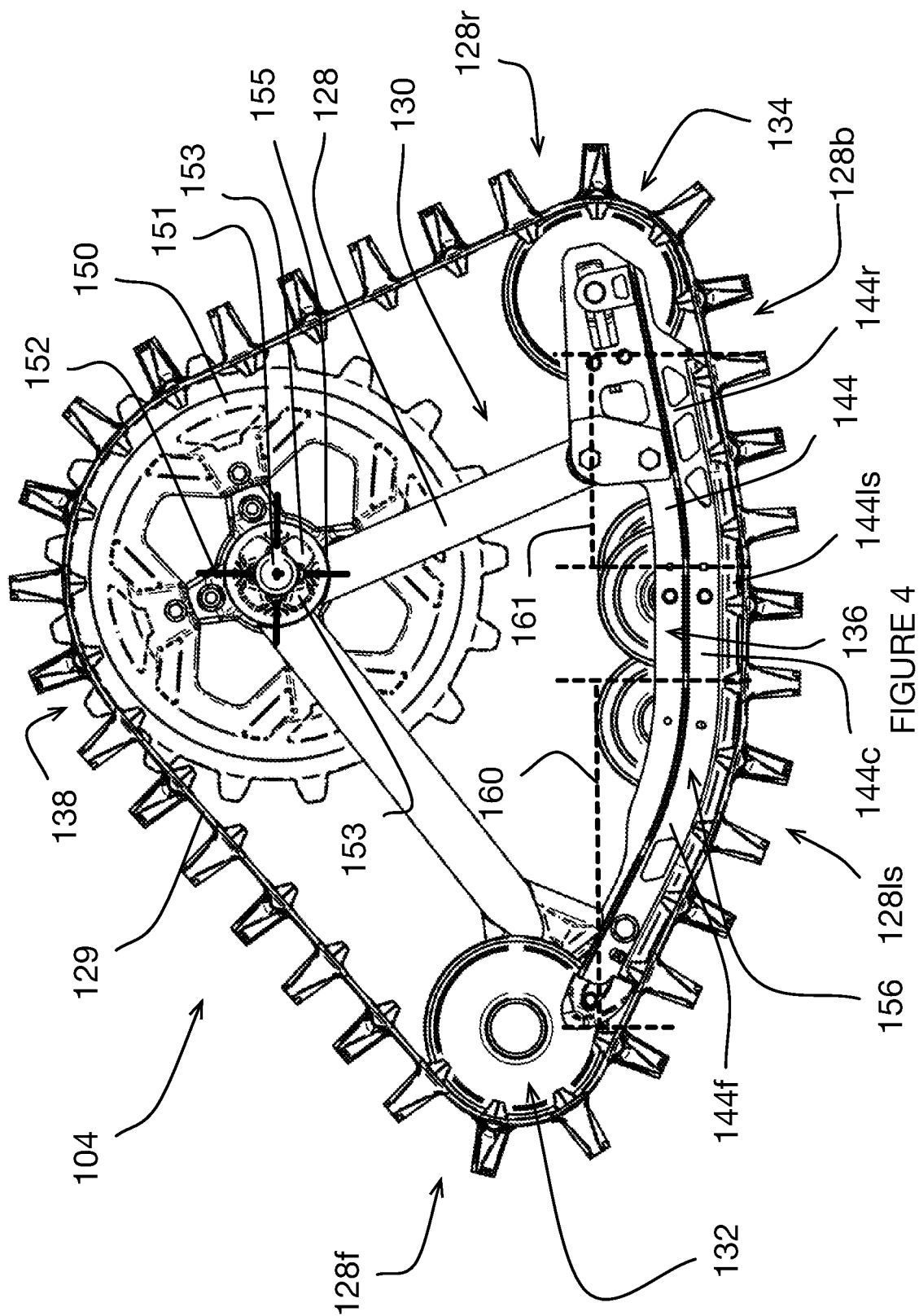
FIG. 4 is an elevation view of a left side of a front left track assembly of the all-terrain vehicle of FIG. 1, according to one implementation of the front left track assembly.
Figure 5:
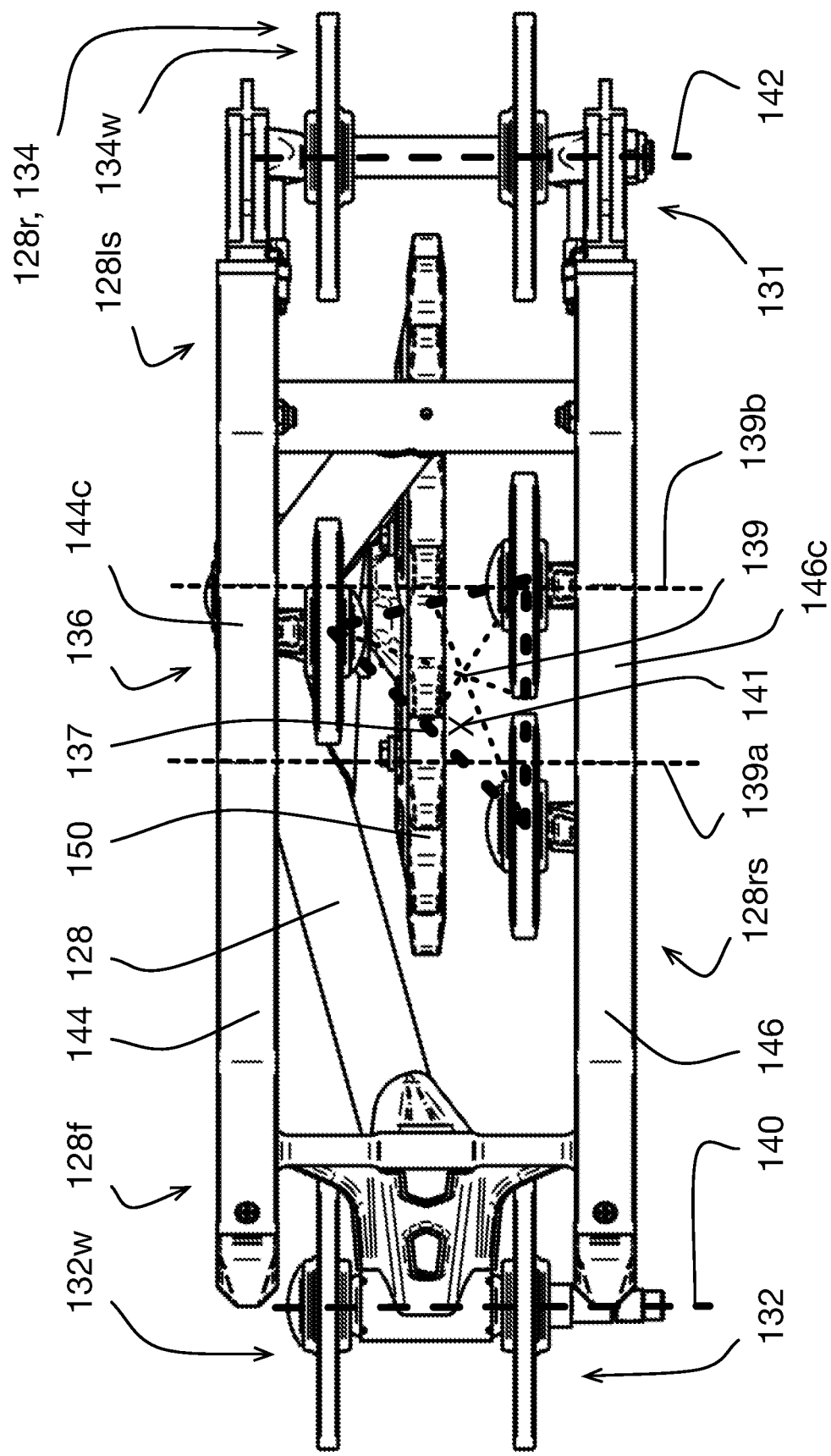
FIG. 5 is a bottom plan view of the front left track assembly of FIG. 4, with an endless track of the front left track assembly removed for clarity.
Figure 6:
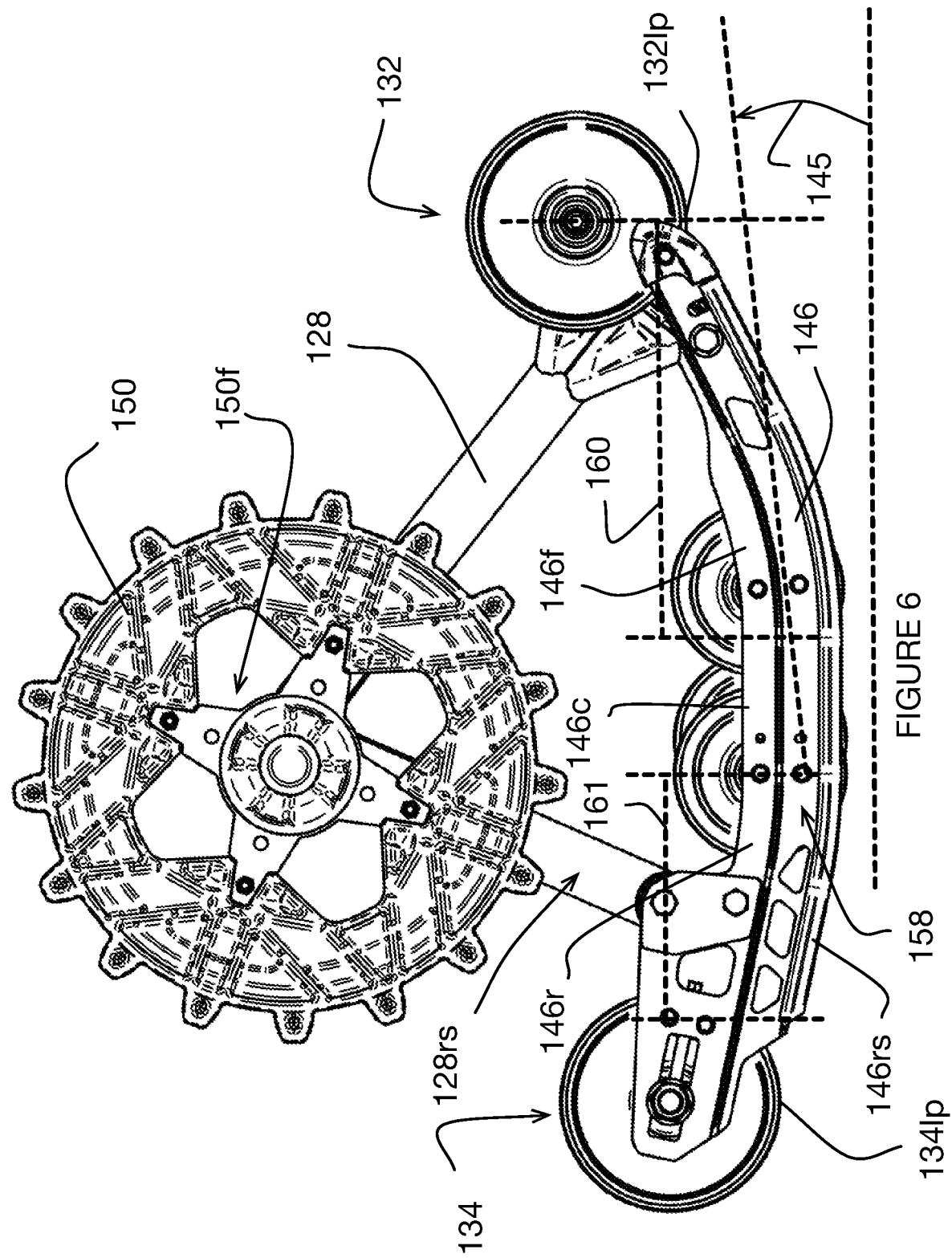
FIG. 6 is an elevation view of a right side of the front left track assembly of FIG. 4, with the endless track of the front left track assembly removed for clarity.

As stated herein above, in the present implementation, the front right track assembly 105 is a mirror image of the front left track assembly 104. Therefore, only the front left track assembly 104 is described herein in detail. FIGS. 4 to 6 show the front left track assembly 104 of the ATV 100 in more detail.

As best shown in these figures, the front left track assembly 104 has a frame 128. The frame 128 includes a plurality of steel frame members 130, a longitudinally-extending left slide rail 144 (FIG. 4), and a longitudinally-extending right slide rail 146 (FIG. 6). The frame 128 has a front 128f, a rear 128r, a bottom 128b, a left side 128ls, and a right side 128rs. FIG. 4 shows the left side 128ls of the front left track assembly 104. FIG. 6 shows the right side 128rs of the front left track assembly 104. The longitudinally-extending left slide rail 144 is connected to the frame members 130 and is positioned at the bottom 128b of the frame 128 on the left side 128ls of the frame 128. The longitudinally-extending right slide rail 146 is connected to the frame members 130 and is positioned at the bottom 128b of the frame 128 on the right side 128rs of the frame 128.

In the present implementation, the frame members 130 are welded to each other and are thus non-mobile relative to each other. It is contemplated that the frame members 130 could be made of other suitable materials and could be interconnected by connections that are different from welded connections. In the present implementation, the frame 128 is suspensionless. It is contemplated that the frame 128 could include a suspension (not shown), such that, for example an upper part of the frame 128 would be sprung relative to a lower part of the frame 128.

The slide rails 144, 146 support an endless track 129 on terrain when the front left track assembly 104 is in use. To that end, in the present implementation, the bottom surface of each of the two slide rails 144, 146 is positioned such that it is supportable by the endless track 129 against terrain when the front left track assembly 104 is in use. In this implementation, the bottom surface of each of the slide rails 144, 146 is provided by a slide made of an ultra-high molecular weight ("UHMW") polymer. FIG. 4 shows the slide 144ls of the left slide rail 144. FIG. 6 shows the slide 146rs of the right slide rail 146.

In the present implementation, each of the slides 144ls, 146rs is held on its corresponding slide rail 144, 146 by a conventionally known combination of T-slot and a screw. It is contemplated that the slides 144ls, 146rs could be secured using a different suitable mechanism, including an adhesive. It is contemplated that the slides 144ls, 146rs could be integral with corresponding ones of the slide rails 144, 146. In some implementations, instead of having the slides 144ls, 146rs, the bottom surfaces of the slide rails 144, 146 are coated a low-friction material such as a UHMW polymer. In the present implementation, the slide rails 144, 146 are shaped to define a travel path for the endless track 129.

As best shown in FIG. 6, in the present implementation, each of the slide rails 144, 146 has a shape defined by three sections of that slide rail 144, 146: a rearward-facing portion, a central portion and a forward-facing portion. FIG. 4 shows the rearward-facing portion 144r, the central portion 144c and the forward-facing portion 144f of the left slide rail 144 of the front left track assembly 104. FIG. 6 shows the rearward-facing portion 146r, the central portion 146c and the forward-facing portion 146f of the right slide rail 146 of the front left track assembly 104. In the present implementation, rearward-facing portion 144r, the central portion 144c and the forward-facing portion 144f of the left slide rail 144 are the same as the rearward-facing portion 146r, the central portion 146c and the forward-facing portion 146f, respectively.

In the present implementation, the central portions 144c, 146c of the slide rails 144, 146 are 111 millimeters in length, as shown by the corresponding dimension lines. This length provides for improved steering characteristics of the front left track assembly 104 in some driving conditions. It has been found that lengths of the central portions 144c, 146c of the slide rails 144, 146 that are between 60 millimeters and 220 millimeters in length provide improved steering characteristics of the front left track assembly 104 in some driving conditions.

As shown, in the present implementation, the forward-facing portions 144f, 146f extend forward from the front ends of the central portions 144c, 146c toward the leading idler wheel assembly 132, by a horizontal projection 160, and are curved upward toward the leading idler wheel assembly 132. In the present implementation, the horizontal projection 160 is 300 millimeters. In other implementations, and depending on the particular application of each particular implementation of the front track assembly 104, the horizontal projection 160 of the forward-facing portions 144*f*, 146*f* is between 250 millimeters and 580 millimeters. It has been found that this range of the horizontal projections 160 in combination with the length of the central portions 144*c*, 146*c*, as described herein, provides performance advantages in some driving conditions.

In the present implementation, the forward-facing portions 144*f*, 146*f* of the slide rails 144, 146 are curved upward from the the central portions 144*c*, 146*c* by an average angle of 27 degrees. In other implementations, the forward-facing portions 144*f*, 146*f* are curved upward from the central portions 144*c*, 146*c* by an average angle that is between 15 and 39 degrees. It has been found that such curvatures, in combination with the forward-facing portions 144*f*, 146*f* having the horizontal projection 160 in the range described herein provide traction improvements in some driving conditions.

In the present implementation, the rearward-facing portions 144*r*, 146*r* of the slide rails 144, 146 extend rearward from the rear ends of the central portions 144*c*, 146*c* by a projection 161 of 212 millimetres and are curved upward from the central portions 144*c*, 146*c*, as shown, by an average angle of 12 degrees. In some implementations, the rearward-facing portions 144*r*, 146*r* are curved upward from the central portions 144*c*, 146*c* by an average angle that is within a range of 3 to 45 degrees. In some implementations, the projection 161 is in a range of 180 millimetres to 240 millimetres. It has been found that such curvatures, in combination with the rearward-facing portions 144*r*, 146*r* having the horizontal projection 161 in the range described herein provide traction improvements in some driving conditions.

In the present implementation, the front left track assembly 104 further includes a single drive wheel assembly 138, a leading idler wheel assembly 132, a trailing idler wheel assembly 134, and three mid-rollers 136. The drive wheel assembly 138 includes a drive wheel 150 that is rotationally mounted to the frame 128 for rotation about a drive wheel axis 152 for driving the endless track 129. In some implementations, the drive wheel assembly 138 has more than one drive wheel mounted to the frame 128 for rotation about the drive wheel axis 152, for driving the endless track 129.

In the present implementation, the drive wheel 150 is a drive sprocket that has a central shaft 151 and is rotationally mounted to the frame 128 for driving the endless track 129 via a plurality of ball bearings 153 (FIG. 4) press-fitted over the central shaft 151 and into a transverse aperture 155 defined in the frame 128. It is contemplated that any other suitable rotational mounting mechanism for the drive wheel 150 could be used. In the present implementation, the drive wheel 150 is connectable to the front left drive axle 114 of the ATV 100. More particularly, in the present implementation and as best shown in FIG. 6, the drive wheel 150 has four flanges 150*f* connected to the shaft 151 of the drive wheel 150 radially about the drive wheel axis 152 of the drive wheel 150. In the present implementation, the flanges 150*f* are integral with the shaft 151. It is contemplated that the flanges 150*f* need not be integral with the shaft 151 and could be connected thereto using any suitable connection, including a welded connection.

As shown in FIG. 6, each of the four flanges 150*f* has an aperture defined therein, which aperture is sized to receive a bolt. The apertures in the flanges 150*f* are arranged to match the bolt pattern of the front left wheel hub (not shown) of the ATV 100, to which front left wheel hub the front left drive axle 114 is connected and which front left wheel hub is original equipment that the ATV 100 was manufactured with.

Therefore, in the present implementation, the drive wheel 150 is connectable to the front left drive axle 114 of the ATV 100 by being fitted onto the front left wheel hub and by being fastened to the front left wheel hub by four bolts received through corresponding ones of the four apertures in the flanges 150*f* and in corresponding ones of four threaded apertures defined in the front left wheel hub. It is contemplated that the drive wheel 150 could have any other number of flanges 150*f* and apertures defined in the flanges 150*f*, to suit at least one bolt pattern of at least one wheel hub of a vehicle. It is contemplated that the drive wheel 150 could have any other suitable mounting mechanism to be connected to a drive axle of a vehicle.

Now referring to FIG. 5, in the present implementation, the leading idler wheel assembly 132 of the front left track assembly 104 has two leading idler wheels 132*w* that are mounted to the front 128*f* of the frame 128 for rotation about a transverse leading idler wheel axis 140. In some implementations, the leading idler wheel assembly 132 has four leading idler wheels 132*w*. In some cases, four-wheeled implementations of the leading idler wheel assembly 132 provide for reduced wear of the endless track 129. In other implementations, the leading idler wheel assembly 132 has different numbers of leading idler wheels 132*w*.

As best shown in FIGS. 4 and 6, in the present implementation, the leading idler wheel assembly 132 is elevated relative to the lowest point on the bottom surfaces of the slide rails 144, 146, which in the present implementation is the bottom surfaces of the central portions 144*c*, 146*c* of the slide rails 144, 146, such that when the ATV 100 is stationary on flat horizontal terrain, the leading idler wheels 132*w* do not contact the flat horizontal terrain.

Turning back to FIG. 5, in the present implementation, the trailing idler wheel assembly 134 has two trailing idler wheels 134*w* mounted to the rear 128*r* of the frame 128 via a tensioner assembly 131, for rotation about a traverse trailing idler wheel axis 142, the trailing idler wheel axis 142 being parallel to the leading idler wheel axis 140. In some implementations, the trailing idler wheel assembly 134 has four trailing idler wheels 134*w*. In some cases, four-wheeled implementations of the trailing idler wheel assembly 134 provide for reduced wear of the endless track 129. In other implementations, the trailing idler wheel assembly 134 has different numbers of trailing idler wheels 134*w*.

As best shown in FIGS. 4 and 6, in the present implementation, the trailing idler wheel assembly 134 is elevated relative to the lowest point on the bottom surfaces of the slide rails 144, 146 such that when the ATV 100 is stationary on flat horizontal terrain, the trailing idler wheels 134*w* do not contact the flat horizontal terrain.

In the present implementation, the tensioner assembly 131 is operable to selectively move the trailing idler wheels 134*w* forward and rearward to adjust tension in an endless track 129 that is to be used with the front left track assembly 104. It is contemplated that the tensioner assembly 131 could be any suitable tensioner assembly. It is also contemplated that, instead of or in addition to the trailing idler wheel assembly 131, the leading idler wheel assembly 132 could be implemented with a suitable tensioner assembly such that leading idler wheel assembly 132 would be used to adjust tension in the endless track 129.

In the present implementation, the endless track 129 is mounted around the leading idler wheels 132w, the trailing idler wheels 134w and the drive wheel 150 and is suitably tensioned by adjustment of the tensioner assembly 131 via a conventionally known tensioning method. As shown, the endless track 129 is in driving engagement with the drive wheel 150. To this end, the endless track 129 includes conventionally known longitudinally distributed apertures (not shown) defined therein. Teeth of the drive wheel 150 are received in corresponding ones of the apertures in the endless track 129 as the endless track 129 is driven by the drive wheel 150.

In the present implementation, the endless track 129 is made using conventionally known materials. It is contemplated that the endless track 129 could be any suitable endless track. It is also contemplated that a different type of endless track 129 could be used to suit each particular implementation of the drive wheel 150. For example, it is contemplated that a friction drive wheel and a corresponding friction drive endless track could be used.

As best shown in FIG. 5, the three mid-rollers 136 of the front left track assembly 104 are rotationally mounted to the slide rails 144, 146, and therefore to the frame 128, via corresponding shafts, and each of the shafts has one mid-roller of the three mid-rollers 136 thereon. In other words, in the present implementation, each of the three mid-rollers 136 is mounted onto a separate mid-roller shaft. Also, in the present implementation, each of the three mid-roller shafts is longitudinally offset from the other two of the three mid-roller shafts.

In the present implementation, each of the mid-roller shafts are attached to corresponding ones of the apertures 156, 158 by a bolt and nut received through the shaft and a corresponding one of the apertures 156, 158. It is contemplated that any other suitable attachment could be used. It is contemplated that the mid-rollers 136 could be rotationally mounted to the slide rails 144, 146, and therefore also to the frame 128, using any other suitable mechanisms.

As best shown in FIG. 6, the three mid-rollers 136 project downward below the bottom surfaces of the slide rails 144, 146 to roll on an interior side of the endless track 129 when the front left track assembly 104 is in use. The mid-rollers 136 thereby support the endless track 129, as best shown in FIG. 2, against terrain when the front left track assembly 104 is in use. In the present implementation, the mid-rollers 136 project downward below the bottom surfaces of the slide rails 144, 146 by 4 millimeters. In other implementations, the mid-rollers 136 project downward below the bottom surfaces of the slide rails 144, 146 by a distance in a range of 2 millimeters to 6 millimeters. As shown in FIG. 6, the mid-rollers 136 extend forward and rearward outside of the front and rear ends of the central portions 144c, 146c of the slide rails 144, 146. This improves steering characteristics of the front left track assembly 104 in some driving conditions. It is contemplated that the mid-rollers 136 need not extend past either end of the central portions 144c, 146c of the slide rails 144, 146.

In some implementations, different numbers of mid-rollers 136 are used. Accordingly, it is contemplated that a different number of mid-roller shafts, or other mid-roller supporting features, to support mid-rollers 136 may be used. In some implementations, mid-rollers 136 are excluded, such that the endless track 129 is supported only by the slide rails 144, 146 in between the leading idler wheel assembly 132 and the trailing idler wheel assembly 134. This configuration provides for improved traction characteristics in some snow driving conditions, including some deep snow driving conditions.

In the present implementation, and as shown in FIGS. 4 and 6, the slide rails 144, 146 are provided with apertures 156, 158, respectively, to some of which apertures 156, 158 the mid-roller shafts are secured. As shown, the number of apertures 156, 158 is greater than the number of mid-roller shafts, and each of the apertures 156, 158 is sized to have any one of the mid-roller shafts attached thereto. Thus, in the present implementation, the position of each of the mid-rollers 136 shown in the Figures, relative to the slide rails 144, 146, is selectively adjustable by attaching the mid-roller shaft of corresponding ones of the mid-rollers 136 to a different one of the apertures 156, 158. Also, in the present implementation, the mid-rollers 136 are swappable between the slide rails 144, 146.

For example, one of the two mid-rollers 136 that is currently attached to the right slide rail 146 could be removed from the right slide rail 146 and attached to one of the apertures 156 of the left slide rail 144. In some cases, this allows a given implementation of the front left track assembly 104 to be usable with a greater number of different vehicles. In some implementations, the mid-rollers 136 are not swappable between the slide rails 144, 146. In some implementations, the positions of the mid-rollers 136 are not adjustable.

Referring to FIG. 5, in the present implementation, each of the mid-rollers 136 is longitudinally offset from the other mid-rollers 136. In this implementation, the longitudinal offsets of the mid-rollers 136 relative to each other are selected such that when the front left track assembly 104 is in use and is driven along flat horizontal terrain, no two of the three mid-rollers 136 roll over any one of the traction lugs of the endless track 129 at the same time. In one aspect, this reduces vibration of the front left track assembly 104 when the front left track assembly 104 is in use. In some cases, this reduces vibration of the front left track assembly 104 when the front left track assembly 104 is driven over a paved road.

To this end, in the present implementation, the endless track 129 has a traction lug pattern as shown in FIGS. 1, 2 and 4. As best shown in FIG. 1, the traction lug pattern includes four longitudinally extending rows of traction lugs 129l. Each of the traction lugs 129l has a height that is in a range of 38 millimeters and 64 millimeters. In one aspect, this traction lug height in combination with the slide rails 144, 146 provides for improved transverse stiffness of the endless track 129 in comparison to at least some prior art track assemblies that use a similar internal track construction and have no slide rails.

Also, as best shown in FIG. 1, the traction lugs 129l in each row of the four rows are longitudinally spaced from one another in that row by 81 millimeters. In turn, the traction lugs 129l in each pair of adjacent rows of the four rows are longitudinally spaced from one another in that pair of rows by 51 millimeters. It has been found that these relative dimensions and offsets provide performance advantages in some driving conditions. It is contemplated that different longitudinal offsets could be used.

In another aspect, and also in the present implementation, each of the traction lugs 129l has a width of one quarter of the width of the endless track 129 and is positioned generally orthogonal to a longitudinal centerline of the endless track 129. The four rows of traction lugs 129l are transversely aligned relative to each other such that there are no gaps in a longitudinal direction in between any adjacent pair of the four rows of traction lugs 129*l*.

This traction lug pattern is further referred to as the 2-2 pattern. It has been found that the 2-2 pattern, in combination with the other features of the front left traction assembly 104 described herein, provides performance advantages in some driving conditions. It is contemplated that a different traction lug pattern could be used. It is also contemplated that in some such implementations, the longitudinal offsets of the mid-rollers 136 could be selected as described herein above to suit a different traction lug pattern to also achieve at least some vibration-reduction functionality.

In another aspect, and as best shown in FIG. 5, in the present implementation the three mid-rollers 136 are arranged such that the areas of contact between each of the mid-rollers 136 and the inner surface of the endless track 129 define a triangle 137. In the present implementation, one of the three mid-rollers 136 is positioned proximate the slide rail 144 and the other two of the three mid-rollers 136 are positioned proximate the slide rail 146. In the present implementation, the area of the triangle 137 is 9,825 millimeters square. In another particular implementation, the area of the triangle 137 is 10,914 millimeters square. In yet other implementations, the area of the triangle 137 is in a range of 8000 millimeters square and 13000 millimeters square.

In some applications, areas of the triangle 137 that are in the abovementioned range provide for improved steering performance in some driving conditions. It is contemplated that the area of the triangle 127 could be outside of the abovementioned range in some applications and implementations of the track assembly 104. In some implementations, the triangle 137 has an area that is in a range of 90% to 150% of an area of contact between a 25×8–12 all-terrain vehicle tire and flat horizontal terrain when the tire is mounted onto an all-terrain vehicle and is stationary on the flat horizontal terrain and the all-terrain vehicle is at gross vehicle weight.

The triangle 137 has a centroid 139. The centroid 139 is positioned longitudinally in between a first transverse reference line 139*a* and a second transverse reference line 139*b*, the first transverse reference line 139*a* passing through the front ends of the first and second central portions 144*c*, 146*c* and the second transverse reference line 139*b* passing through the rear ends of the first and second central portions 144*c*, 146*c*. In this implementation, the centroid 139 is positioned in front of the drive wheel axis 152. It is contemplated that in some implementations the centroid 139 could be positioned directly below or rearward of the drive wheel axis 152.

In the present implementation, the longitudinal positions of the mid-rollers 136 relative to the slide rails 144, 146 are selected such that the centroid 139 is rearward of a point 141 at which the front left steering axis 113*a* crosses the interior surface of the endless track 129 when the ATV 100, and therefore also the front left track system 104, is stationary on flat horizontal terrain. This configuration improves some handling performance characteristics of the front left track system 104 in some driving conditions. In some driving conditions, this configuration improves steering characteristics of the ATV 100.

In the present implementation, the central portions 144*c*, 146*c* of the slide rails 144, 146 are horizontal (i.e. parallel to the flat horizontal terrain) when the ATV 100, and therefore also the front left track system 104, is stationary on flat horizontal terrain. In other implementations, the rotation limiting devices 104*ls*, 105*rs* are adjusted such that when the ATV 100, and therefore also the front left track system 104, is stationary on flat horizontal terrain, the central portions 144*c*, 146*c* of the slide rails 144, 146 are angled upward away from the flat horizontal terrain in a forward direction as shown schematically with reference arrow 145 in FIG. 6. In such other implementations, the forward ends of the central portions 144*c*, 146*c* of the slide rails 144, 146 are farther upward from the flat horizontal terrain than the rear ends of the central portions 144*c*, 146*c*.

In some implementations, the angle 145 is two degrees relative to the flat horizontal terrain. In some implementations, and depending on each particular application of the front left track system 104, the angle 145 is between zero degrees and four degrees. Such configurations provide for improved traction and steering characteristics of the front left track system 104 in some driving conditions.

Implementation of FIGS. 7 to 11

Referring to FIGS. 7 to 11, a front left track assembly 162, which is an alternative implementation of the front left track assembly 104 is shown.

The front left track assembly 162 is the same as the front left track assembly 104 except insofar as described to the contrary herein below. In FIGS. 7 to 11, elements of the front left track assembly 162 that are the same as corresponding elements of the front left track assembly 104 have been labeled with the same reference numerals as the corresponding elements of the front left track assembly 104.

Figure 8:
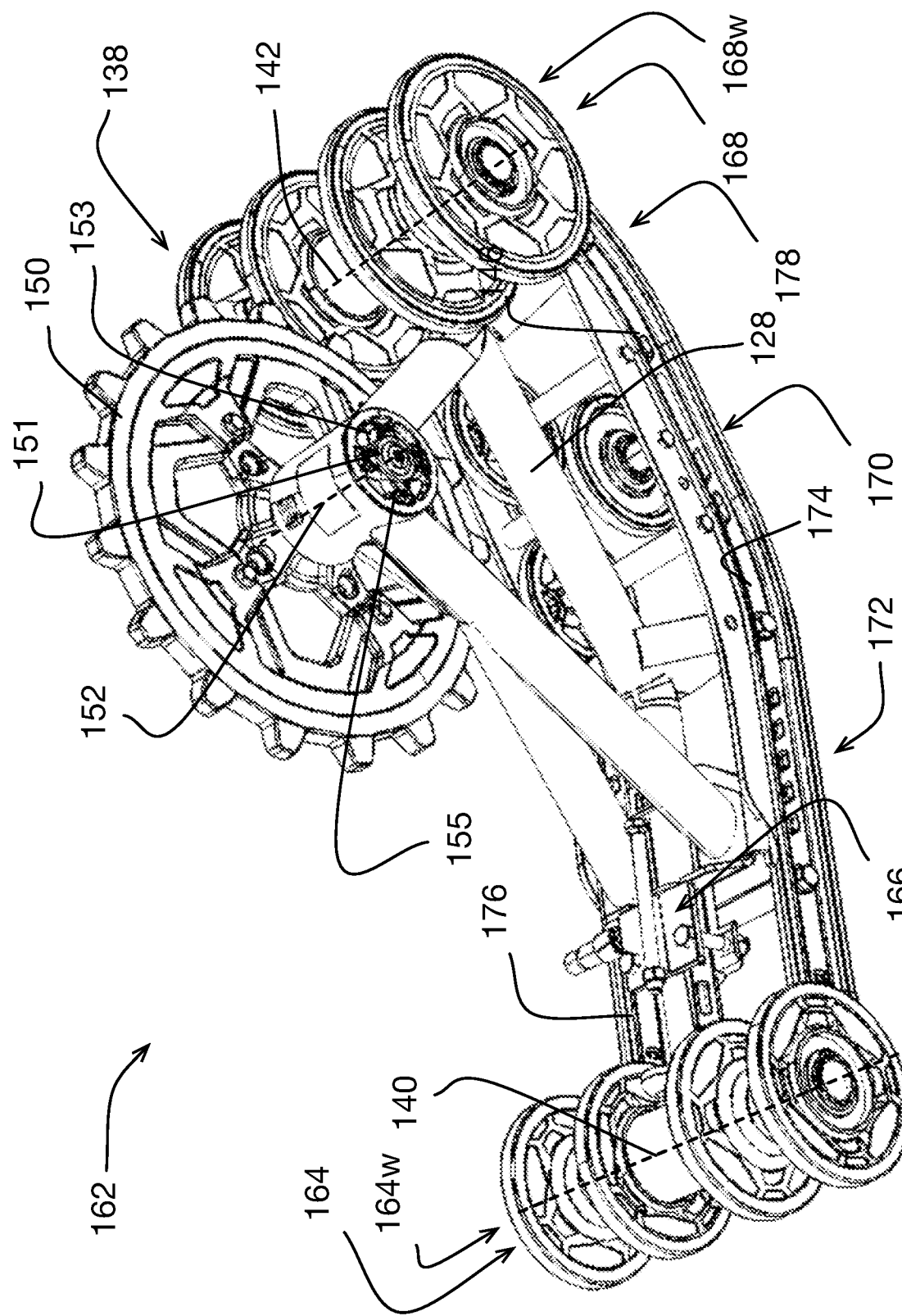
FIG. 8 is a perspective view of the left front top side of the front left track assembly of FIG. 7, with an endless track of the front left track assembly removed for clarity.

As best shown in FIG. 8, the leading idler wheel assembly 164 of the front left track assembly 162 has four leading idler wheels 164*w* that are mounted to the front 128*f* of the frame 128 via a tensioner assembly 166 for rotation about a transverse leading idler wheel axis 140. In the present implementation, the tensioner assembly 166 is operable to selectively move the leading idler wheels 164*w* forward and rearward to adjust tension in an endless track 129*l* that is to be used with the front left track assembly 162. It is contemplated that the tensioner assembly 166 could be any suitable tensioner assembly. In some cases, the four-wheeled implementation of the leading idler wheel assembly 162 provides for reduced wear of the endless track 129*l* (shown schematically) used with the front left track assembly 162.

In the present implementation, the trailing idler wheel assembly 168 of the front left track assembly 162 has four trailing idler wheels 168*w* mounted to the rear 128*r* of the frame 128, for rotation about a traverse trailing idler wheel axis 142. In some cases, the four-wheeled implementation of the trailing idler wheel assembly 168 provides for reduced wear of the endless track 129 used with the front left track assembly 162. In other implementations, the trailing idler wheel assembly 168 has different numbers of trailing idler wheels 134*w*.

Figure 9:
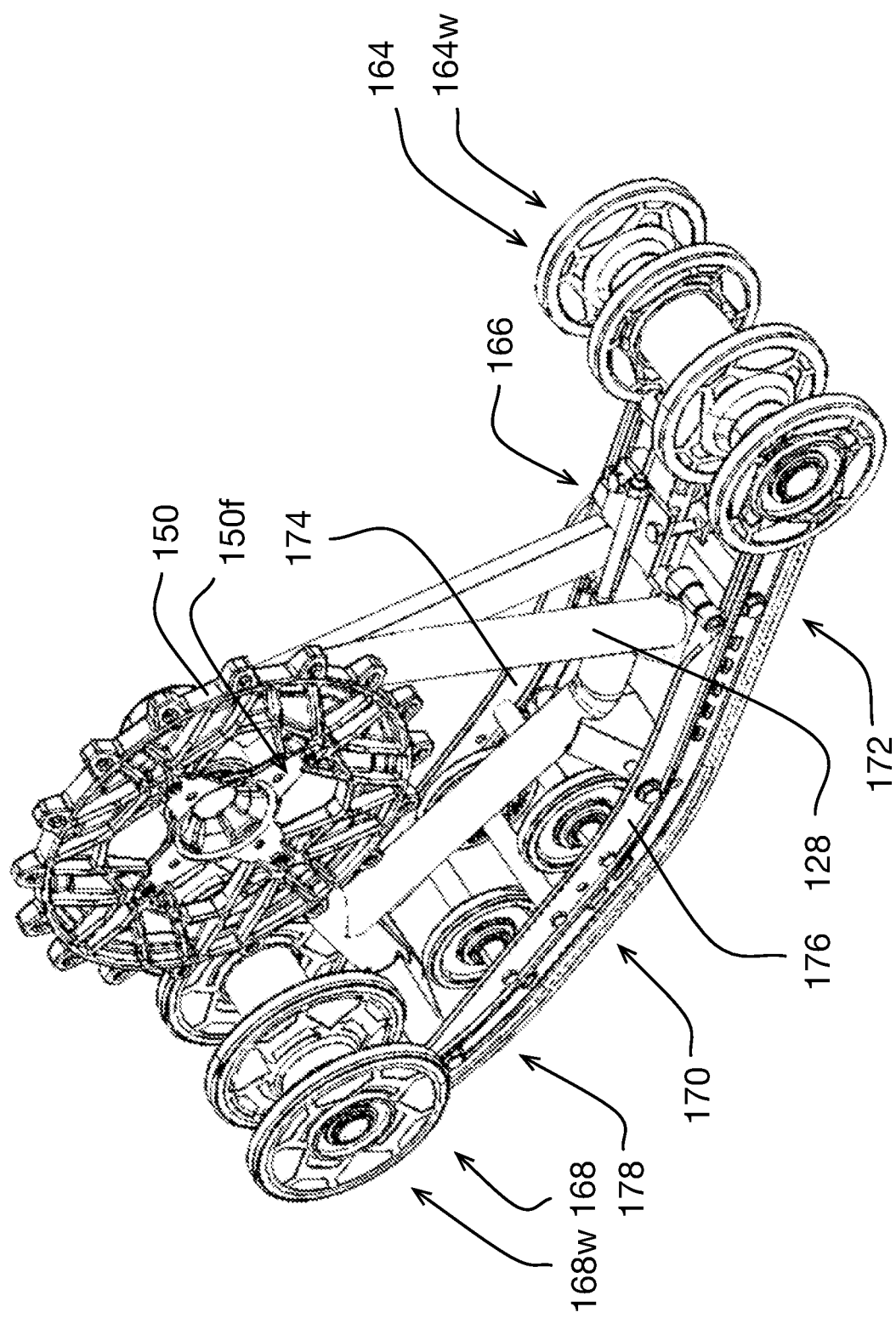
FIG. 9 is a perspective view of a right front top side of the front left track assembly of FIG. 7, with the endless track of the front left track assembly removed for clarity.
Figure 11:
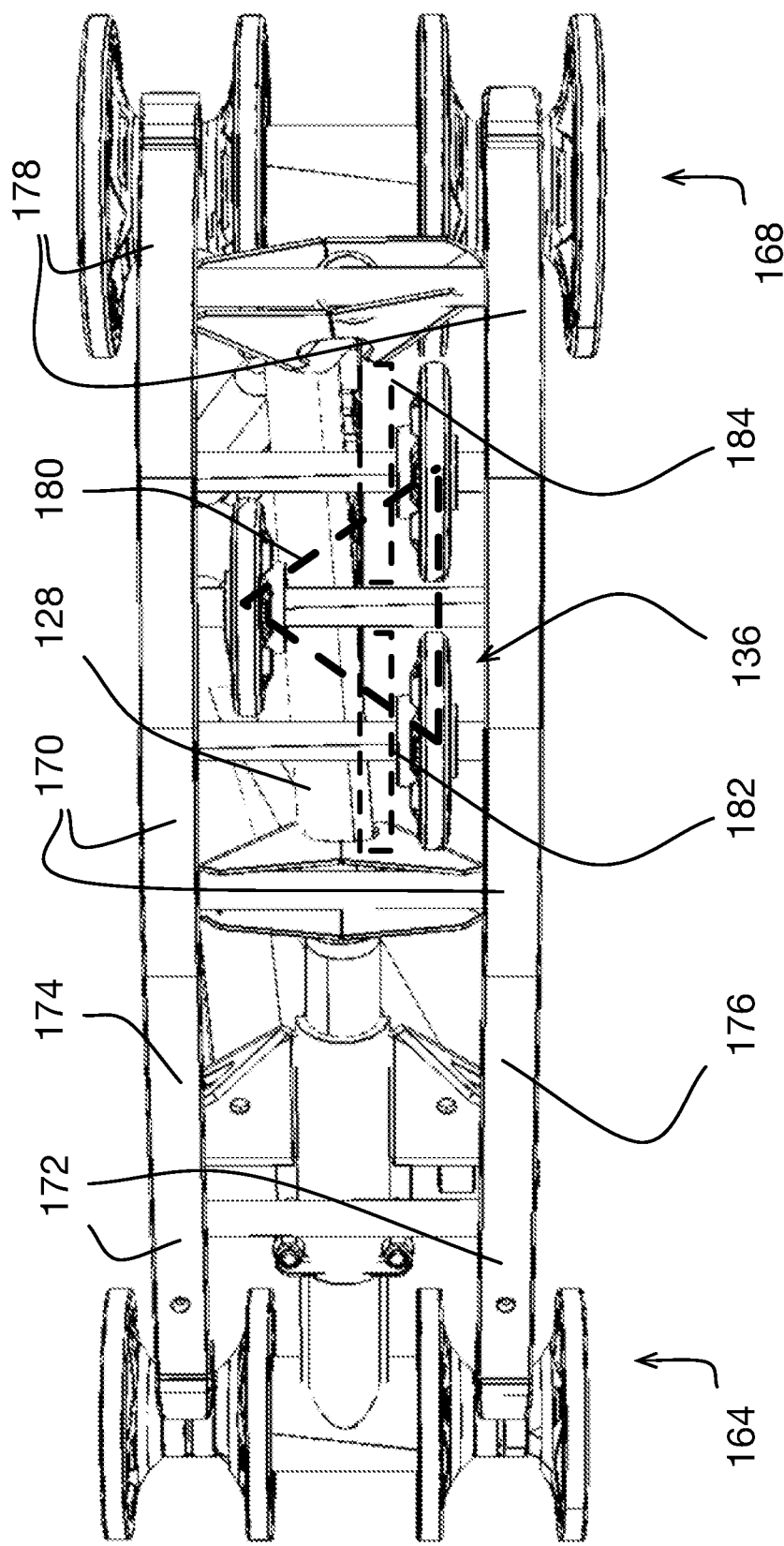
FIG. 11 is a bottom plan view of the front left track assembly of FIG. 7, with the endless track of the front left track assembly removed for clarity.

As best shown in FIGS. 8, 9 and 11, in the present implementation, the central portions 170 and the forward-facing portions 172 of the slide rails 174, 176 of the front left track assembly 162 are longer than the central portions 144*c*, 146*c* and the forward-facing portions 144*f*, 146*f* of the slide rails 144, 146 of the front left track assembly 104, respectively. More particularly, in the present implementation, the central portions 170 of the slide rails 174, 176 are 162 millimeters in length, and the forward-facing portions 176 of the slide rails 174, 176 have a horizontal projection of 470 millimeters forward from the front ends of the central portions 170. The rearward-facing portions 178 in this implementation extend rearward from the rear ends of the central portions 170 by a horizontal projection of 245 millimeters. Accordingly, the endless track 129*l* is suitably longer than the endless track 129.

Figure 7:
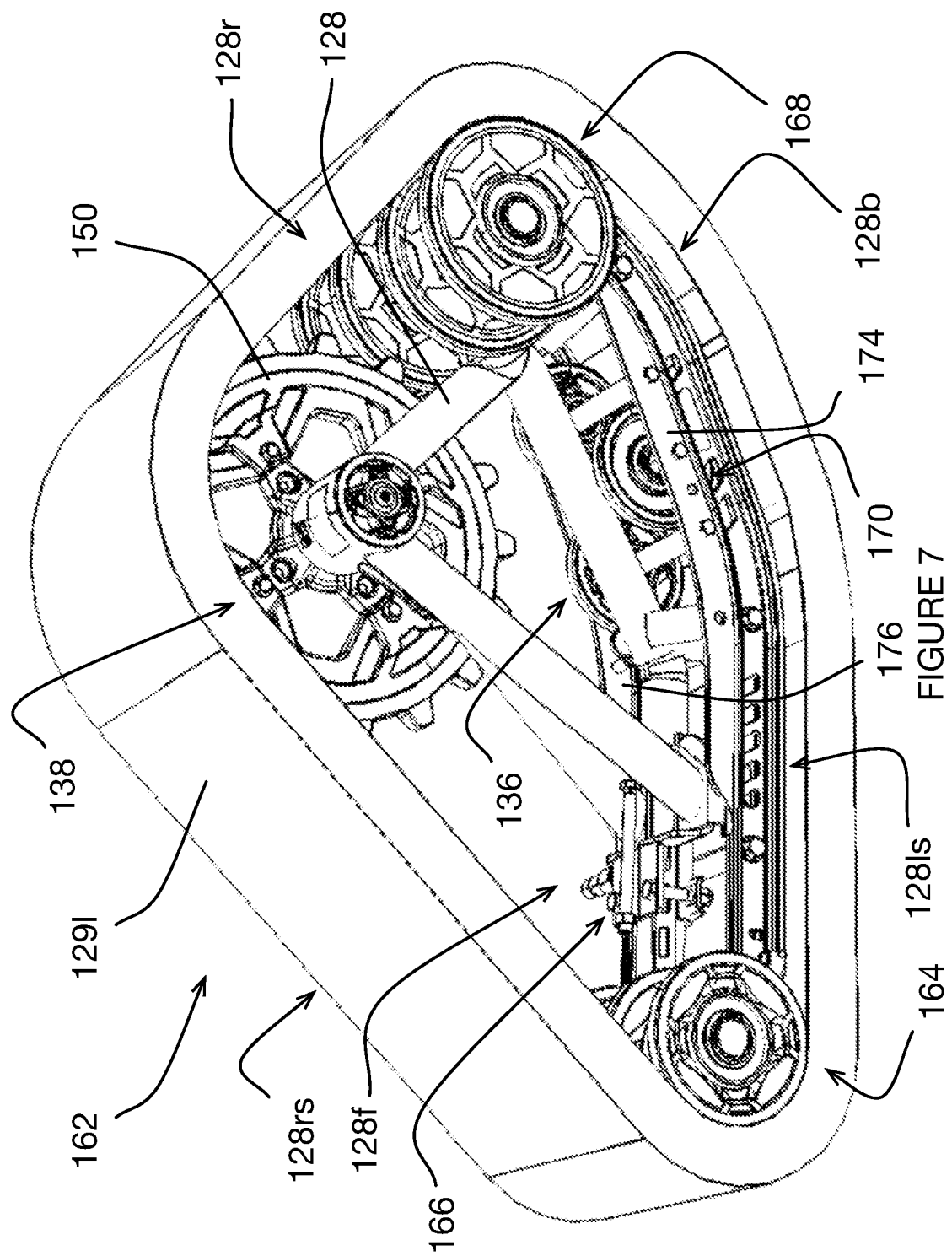
FIG. 7 is a perspective view of a left front top side of the front left track assembly of the all-terrain vehicle of FIG. 1, according to another implementation of the front left track assembly.
Figure 10:
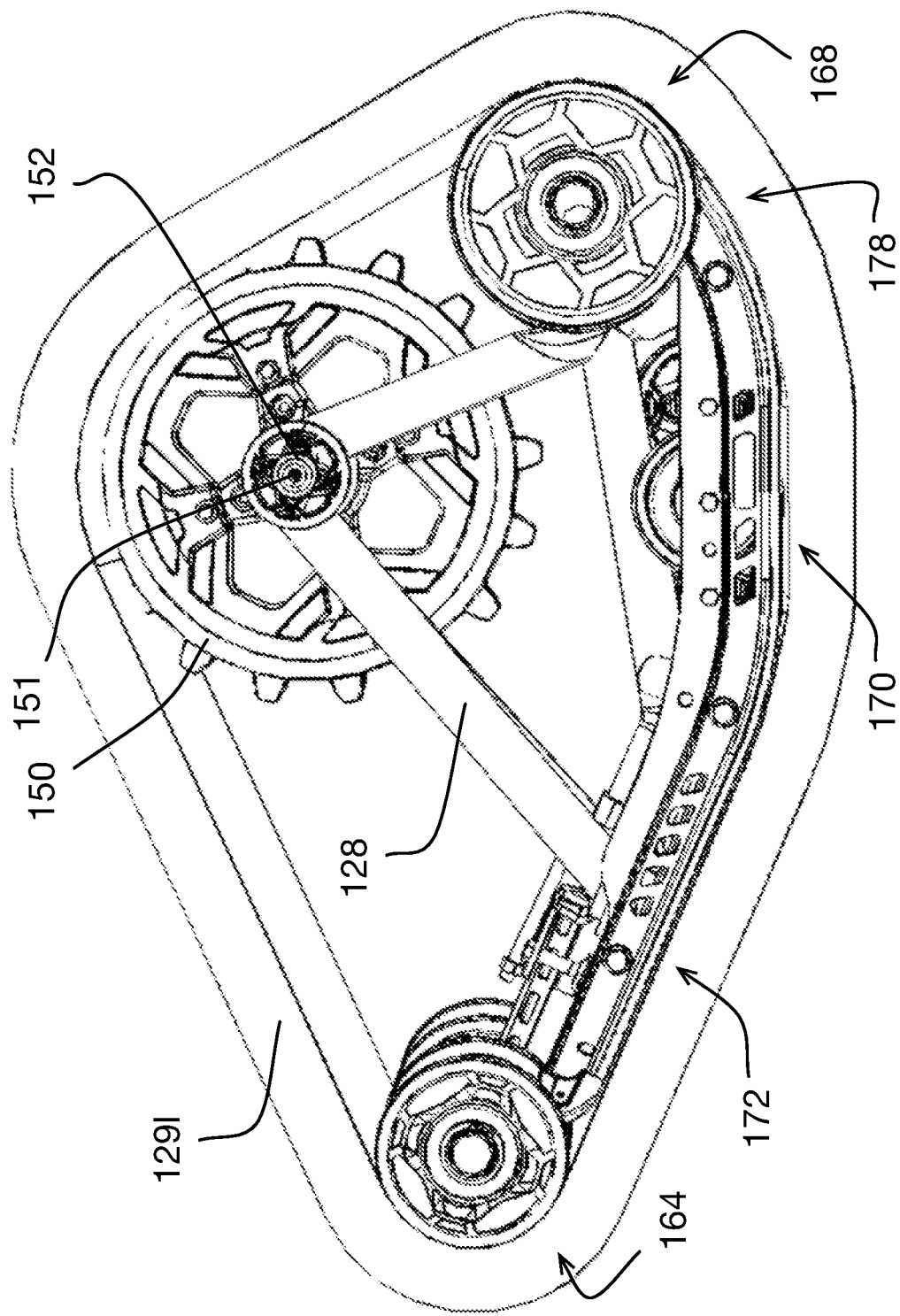
FIG. 10 is an elevation view of the left side of the front left track assembly of FIG. 7, with the endless track of the front left track assembly being shown schematically.

While the endless track 129*l* is shown in FIGS. 7 and 10 schematically, in the present implementation, the endless track 129*l* has the same 2-2 traction lug pattern as the endless track 129. It is contemplated that another traction lug pattern could be used.

As best shown in FIG. 10, in the present implementation, the forward-facing portions 176 of the slide rails 174, 176 are angled upward from the central portions 170 by an average angle of 24 degrees, and the rearward-facing portions 178 of the slide rails 174, 176 are angled upward from the central portions 170 by an average angle of 34 degrees. This combination of features of the front left track assembly 162 provides performance advantages in some applications of the front left track assembly 162. As seen here, similar to the front left track assembly 104, the forward-facing portions 176 are longer than the central portion 170. Similar to the front left track assembly 104, this provides traction improvements in some driving conditions.

Now referring to FIG. 11, in the present implementation, each of the mid-roller shafts via which the mid-rollers 136 of the front left track assembly 162 are rotationally mounted to the slide rails 174, 176 is mounted at one end to the slide rail 174 and at the other end to the slide rail 176. In one aspect, connection of each of the mid-roller shafts at both ends to the frame 128 helps reduce stresses and forces experienced by the slide rails 174, 176 when the track assembly 162 is used in some applications.

Also, as best shown in FIG. 11, in the present implementation, the mid-rollers 136 of the front left track assembly 162 are longitudinally arranged relative to the slide rails 174, 176 to form a triangle 180. The triangle 180 defines an effective contact patch between the endless track 129 and flat horizontal terrain on which the front left track assembly 162 may be used. In some applications, this arrangement reduces wear on the slides 144*ls*, 146*rs*. In some applications, this arrangement reduces vibrations transmitted to the vehicle with which the track assembly 162 is used.

In the present implementation, two of the mid-rollers 136 are positioned proximate the outer (left side) slide rail 174, and one of the mid-rollers 136 is positioned proximate the inner (right side) slide rail 176. In some implementations, two of the mid-rollers 136 are positioned proximate the inner (right side) slide rail 176 and one of the mid-rollers 136 is positioned proximate the outer (left side) slide rail 174.

As shown in FIG. 11, in some implementations, each of two of the shafts via which the mid-rollers 136 are rotationally mounted to the slide rails 174, 176 have an additional mid-roller 182, 184 mounted thereon. In such implementations, the mid-rollers 136, 182, 184 form a different shape instead of the triangle 180. This configuration provides traction advantages in some driving conditions.

Manufacturing and Materials

It is contemplated that new vehicles, such as the ATV 100 and side-by-side vehicles, could be manufactured with the track assemblies 104, 105, 106, 108, 162. It is contemplated an existing vehicle could be retrofitted by, for example, replacing the wheels of the existing vehicle with corresponding ones of the track assemblies 104, 105, 106, 108, 162.

It is contemplated that the track assemblies 104, 105, 106, 108, 162 could be made using any suitable conventionally known combination of materials and manufacturing method(s). It is contemplated that the track assemblies 104, 105, 106, 108, 162 could be manufactured, assembled, or sold without an endless track 129, 129*l*. It is contemplated that the track assemblies 104, 105, 106, 108, 162 could be manufactured, assembled, or sold with corresponding endless tracks 129 but without the endless tracks 129 being mounted on the track assemblies 104, 105, 106, 108, 162.

Modifications and improvements to the above-described implementations of the present technology may become apparent to those skilled in the art. The foregoing description is intended to be exemplary rather than limiting.

The invention claimed is:

1. A kit of track assemblies for a vehicle, the vehicle having a front left drive axle, a front right drive axle, a rear left drive axle and rear right drive axle, the kit comprising:
    left and right front track assemblies mountable to the front left drive axle and the front right drive axle respectively, each of the left and right front track assembly including:
        a frame having a front, a rear, a bottom, a left side, and a right side, a longitudinally-extending left slide rail positioned at the bottom of the frame on the left side of the frame, and a longitudinally-extending right slide rail positioned at the bottom of the frame on the right side of the frame;
        a drive wheel rotationally mounted to the frame for rotation about a drive wheel axis, the drive wheel having a peripheral surface, the drive wheel being structured to be operatively connectable to the corresponding one of the front left drive axle and the front right drive axle of the vehicle to be driven by the one of the front left drive axle and the front right drive axle and to support a part of the vehicle's weight on terrain;
        a front idler wheel assembly mounted at the front of the frame for rotation about a front idler wheel assembly axis parallel to the drive wheel axis, the front idler wheel assembly having a peripheral surface;
        a rear idler wheel assembly mounted at the rear of the frame for rotation about a rear idler wheel assembly axis parallel to the drive wheel axis, the rear idler wheel assembly having a peripheral surface; and
        an endless track having an inner surface facing the drive wheel, and an outer surface opposite the inner surface, the outer surface having a plurality of traction lugs distributed along the outer surface;
        the left and right slide rails, the drive wheel, the front idler wheel assembly and the rear idler wheel assembly being positioned relative to the frame to support endless track around the left and right slide rails, the drive wheel peripheral surface, the front idler wheel assembly peripheral surface, and the rear idler wheel assembly peripheral surface,
        a bottom surface of each of the left and right slide rails supporting the endless track against flat horizontal terrain when the track assembly is mounted on the one of the front left drive axle and the front right drive axle of the vehicle and the vehicle is stationary on the flat horizontal terrain,
        the endless track being in driving engagement with the drive wheel,
    at least one of the front idler wheel assembly and the rear idler wheel assembly being selectively movable between a plurality of longitudinally-distributed tension positions to tension endless track,
    the left slide rail having,
        a first central portion, the first central portion having a central portion length,
        a first forward-facing portion extending forward from a front end of the first central portion by a forward horizontal projection and being angled upward from the first central portion, and
        a first rearward-facing portion extending rearward from a rear end of the first central portion by a rearward horizontal projection and being angled upward from the first central portion, the right slide rail having,
a second central portion, the second central portion having the central portion length,
a second forward-facing portion extending forward from a front end of the second central portion by the forward horizontal projection and being angled upward from the second central portion, and
a second rearward-facing portion extending rearward from a rear end of the second central portion by the rearward horizontal projection, and being angled upward from the second central portion,
the forward horizontal projection being greater than the central portion length; and left and right rear track assemblies mountable to the rear left drive axle and the rear right drive axle respectively, the rear track assembly including:
a frame;
a drive wheel rotationally mounted to the frame and being structured to be operatively connectable to the corresponding one of the rear left drive axle and the rear right drive axle of the vehicle to be driven by the one of the rear left drive axle and the rear right drive axle and to support a part of the vehicle's weight on terrain;
a front idler wheel assembly mounted at the front of the frame;
a rear idler wheel assembly mounted at the rear of the frame; and
an endless track having an inner surface facing the drive wheel, the front idler wheel assembly and the rear idler wheel assembly, and an outer surface opposite the inner surface, the outer surface having a plurality of traction lugs distributed along the outer surface,
wherein each of the rear track assemblies further includes a dynamic traction device having one end connected to the frame and another end connected to the vehicle when the rear track assembly is in use.

2. The kit of claim 1, wherein the frame of each of the rear track assembly has a front, a rear, a bottom, a left side, and a right side, and the frame further comprises:
a longitudinally-extending left slide rail positioned at the bottom of the frame, the left slide rail having a bottom surface having an upward curvature, a front end, a rear end and a length, and
a longitudinally-extending right slide rail positioned at the bottom of the frame, the right slide rail having a bottom surface having an upward curvature, a front end, a rear end, and a length; and
the endless track being in driving engagement with the drive wheel and being supported by the left and right slide rails for sliding on the bottom surfaces of the left and right slide rails.

3. The kit of claim 1, wherein, in at least one of the track assemblies, the drive wheel, wheels of the front idler wheel assembly and wheels of the rear idler wheel assembly are the sole wheels of the track assembly contacting the endless track.

4. A vehicle having a front left drive axle, a front right drive axle, a rear left drive axle and rear right drive axle, the vehicle comprising:
a front track assembly mounted to one of the front left drive axle and the front right drive axle, the front track assembly including:

a frame having a front, a rear, a bottom, a left side, and a right side, a longitudinally-extending left slide rail positioned at the bottom of the frame on the left side of the frame, and a longitudinally-extending right slide rail positioned at the bottom of the frame on the right side of the frame;
a drive wheel rotationally mounted to the frame for rotation about a drive wheel axis, the drive wheel having a peripheral surface, the drive wheel being structured to be operatively connected to the one of the front left drive axle and the front right drive axle of the vehicle to be driven by the one of the front left drive axle and the front right drive axle and to support a part of the vehicle's weight on terrain;
a front idler wheel assembly mounted at the front of the frame for rotation about a front idler wheel assembly axis parallel to the drive wheel axis, the front idler wheel assembly having a peripheral surface;
a rear idler wheel assembly mounted at the rear of the frame for rotation about a rear idler wheel assembly axis parallel to the drive wheel axis, the rear idler wheel assembly having a peripheral surface; and
an endless track having an inner surface facing the drive wheel, and an outer surface opposite the inner surface, the outer surface having a plurality of traction lugs distributed along the outer surface;
the left and right slide rails, the drive wheel, the front idler wheel assembly and the rear idler wheel assembly being positioned relative to the frame to support the endless track around the left and right slide rails, the drive wheel peripheral surface, the front idler wheel assembly peripheral surface, and the rear idler wheel assembly peripheral surface,
a bottom surface of each of the left and right slide rails supporting the endless track against flat horizontal terrain when the track assembly is mounted on the one of the front left drive axle and the front right drive axle of the vehicle and the vehicle is stationary on the flat horizontal terrain,
the endless track being in driving engagement with the drive wheel,
at least one of the front idler wheel assembly and the rear idler wheel assembly being selectively movable between a plurality of longitudinally-distributed tension positions to tension endless track,
the left slide rail having,
a first central portion, the first central portion having a central portion length,
a first forward-facing portion extending forward from a front end of the first central portion by a forward horizontal projection and being angled upward from the first central portion, and
a first rearward-facing portion extending rearward from a rear end of the first central portion by a rearward horizontal projection and being angled upward from the first central portion,
the right slide rail having,
a second central portion, the second central portion having the central portion length,
a second forward-facing portion extending forward from a front end of the second central portion by the forward horizontal projection and being angled upward from the second central portion, and
a second rearward-facing portion extending rearward from a rear end of the second central portion by the rearward horizontal projection, and being angled upward from the second central portion, the forward horizontal projection being greater than the central portion length; and a rear track assembly mounted to one of the rear left drive axle and the rear right drive axle, the rear track assembly including:

a frame;

a drive wheel rotationally mounted to the frame and being structured to be operatively connected to the one of the rear left drive axle and the rear right drive axle of the vehicle to be driven by the one of the rear left drive axle and the rear right drive axle and to support a part of the vehicle's weight on terrain;

a front idler wheel assembly mounted at the front of the frame;

a rear idler wheel assembly mounted at the rear of the frame; and an endless track having an inner surface facing the drive wheel, the front idler wheel assembly and the rear idler wheel assembly, and an outer surface opposite the inner surface, the outer surface having a plurality of traction lugs distributed along the outer surface;

wherein the rear track assembly further includes a dynamic traction device having one end connected to the frame and another end connected to the vehicle when the rear track assembly is in use.

5. The vehicle of claim 4, wherein the frame of the rear track assembly has a front, a rear, a bottom, a left side, and a right side, and the frame further comprises:

a longitudinally-extending left slide rail positioned at the bottom of the frame, the left slide rail having a bottom surface having an upward curvature, a front end, a rear end and a length, and a longitudinally-extending right slide rail positioned at the bottom of the frame, the right slide rail having a bottom surface having an upward curvature, a front end, a rear end, and a length; and the endless track being in driving engagement with the drive wheel and being supported by the left and right slide rails for sliding on the bottom surfaces of the left and right slide rails.

6. The vehicle of claim 4, wherein, in at least one of the front and rear track assemblies, the drive wheel, wheels of the front idler wheel assembly and wheels of the rear idler wheel assembly are the sole wheels of the track assembly contacting the endless track.

7. The vehicle of claim 4, wherein the vehicle is one of an all-terrain vehicle, a utility-terrain vehicle, a side-by-side vehicle, and a wheelchair.

* * * * *